United States Patent [19]

Shepard, Jr.

[11] Patent Number: 4,600,872
[45] Date of Patent: Jul. 15, 1986

[54] APPARATUS FOR VARIABLE SPEED DRIVE OF AN INDUCTION MOTOR FROM A FIXED FREQUENCY AC SOURCE

[76] Inventor: Francis H. Shepard, Jr., 16 Lee Lane Countryside, Summit, N.J. 07901

[21] Appl. No.: 713,762

[22] Filed: Mar. 20, 1985

Related U.S. Application Data

[62] Division of Ser. No. 395,331, Jul. 6, 1982.

[51] Int. Cl.⁴ .......................... G05B 1/06; G05F 1/325
[52] U.S. Cl. ..................................... 318/658; 323/334; 323/302; 323/250
[58] Field of Search ................ 318/658; 323/334, 333, 323/335, 253, 302, 249, 250, 253, 251–252; 324/133

[56] References Cited

U.S. PATENT DOCUMENTS

| | | | |
|---|---|---|---|
| 3,184,675 | 5/1965 | Mackler | 323/334 |
| 3,389,330 | 6/1968 | Demeur | 323/335 |
| 4,243,931 | 1/1981 | dela Cruz | 323/302 |
| 4,378,522 | 3/1983 | Suladze | 323/334 |

FOREIGN PATENT DOCUMENTS 46-37129 11/1971 Japan ..................................... 323/334

Primary Examiner—William M. Shoop, Jr.
Assistant Examiner—Patrick C. Keane
Attorney, Agent, or Firm—Albert F. Kronman

[57] ABSTRACT

A control system for driving a variable speed AC motor employing a fixed frequency AC power source, combines pulses representative of a desired slip frequency with pulses of a frequency proportional to the speed of the motor. The combined pulses are employed with a speed command signal to set a threshold which determines the fraction of each cycle of the AC primary power which is fed to the motor. In addition, the speed and slip pulses are employed to direct the AC power to specific ones of the windings of the motor to thereby create a rotating magnetic field in the induction motor. An array of silicon-controlled rectifiers does the actual gating and an SCR protect circuit ensures that transfer of control from one SCR to another is inhibited until all current ceases to flow in an SCR being extinguished. A forced commutation circuit forces the extinction of all current remaining in the last conducting SCR feeding a motor winding at the transfer time from that motor winding to the next.

3 Claims, 41 Drawing Figures

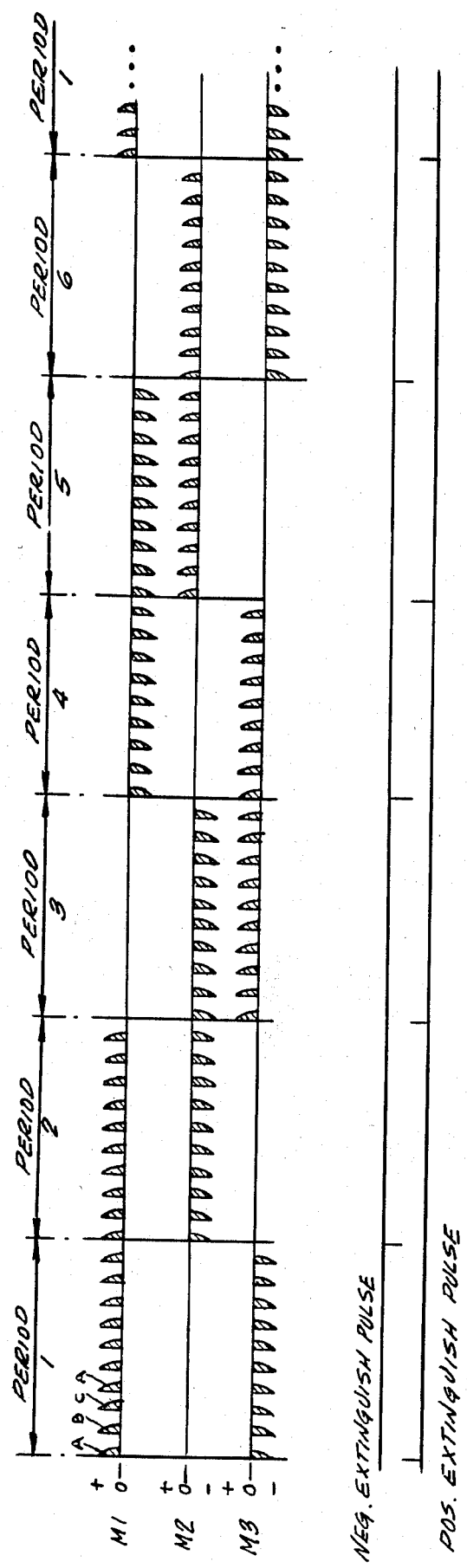

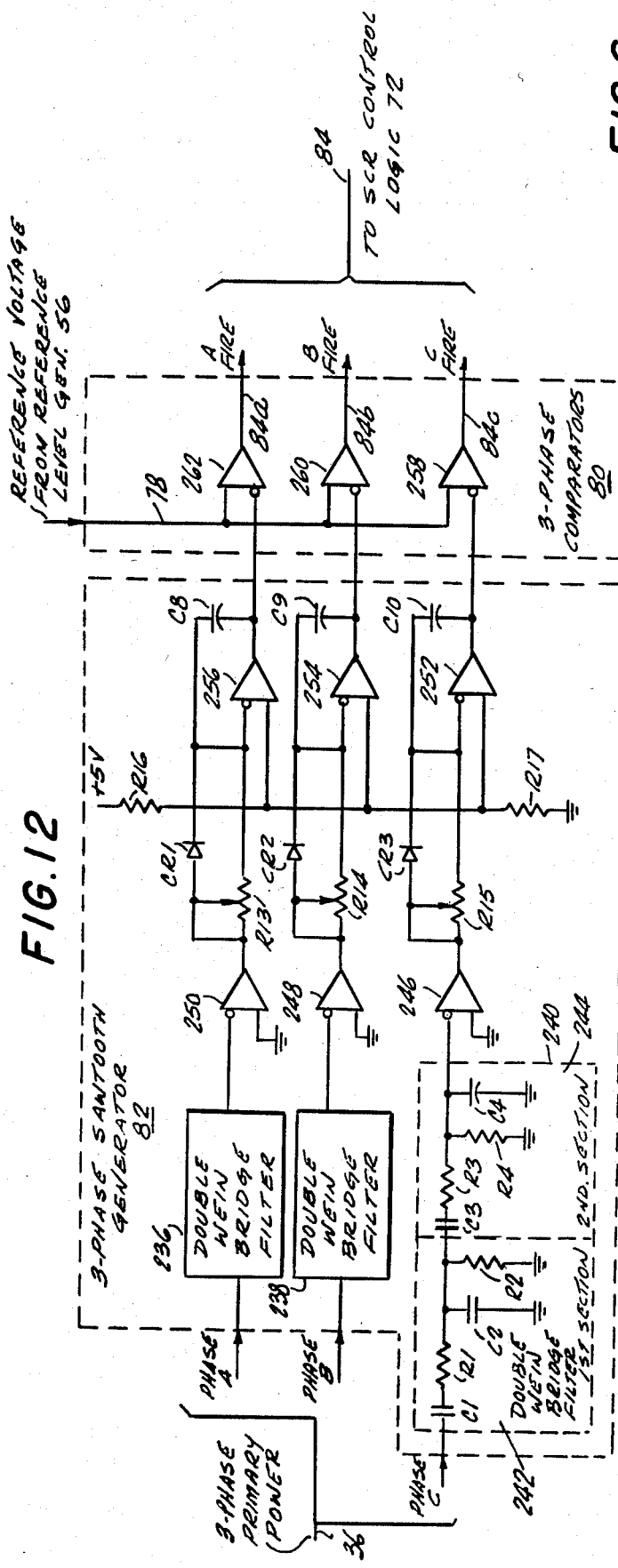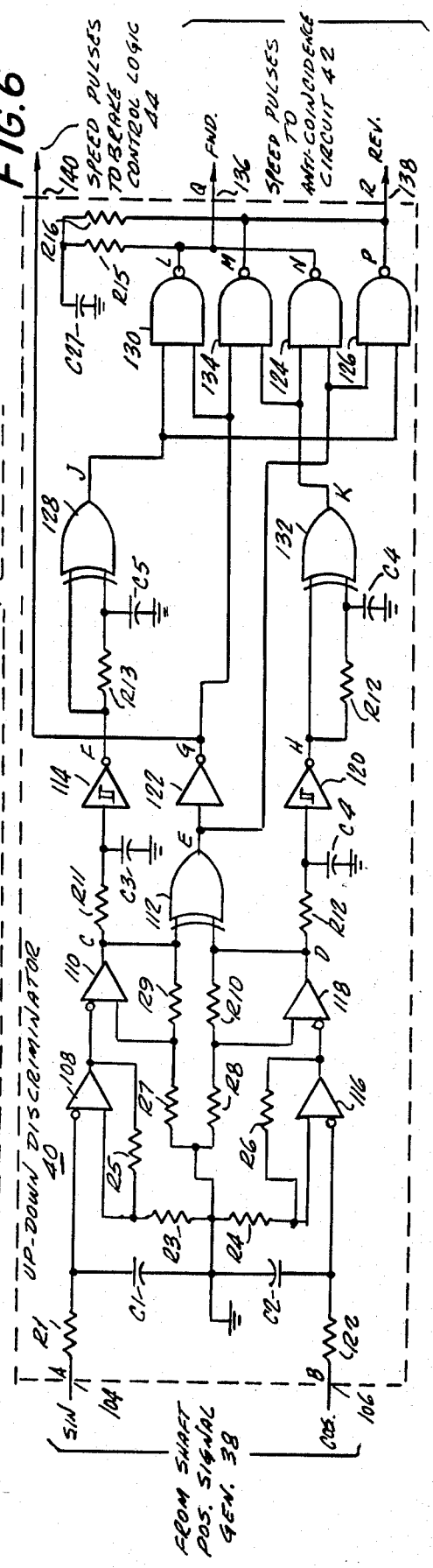
FIG.12
FIG.6

FIG. 7A  SIN 
FIG. 7B  COS 
FIG. 7C  SIN$_s$ 
FIG. 7D  COS$_s$ 
FIG. 7E  SIN$_s$ COS$_s$ 

FIG. 7L  $\overline{J \times G}$ 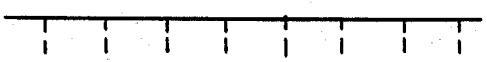
FIG. 7M  $\overline{K \times G}$ 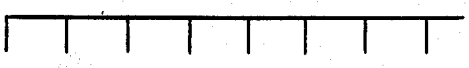
FIG. 7N  $\overline{K \times E}$ 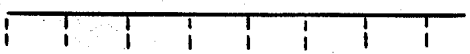
FIG. 7P  $\overline{J \times E}$ 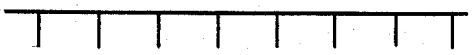
FIG. 7Q  $L+N$ 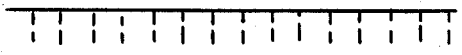
FIG. 7R  $M+P$ 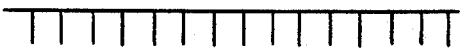

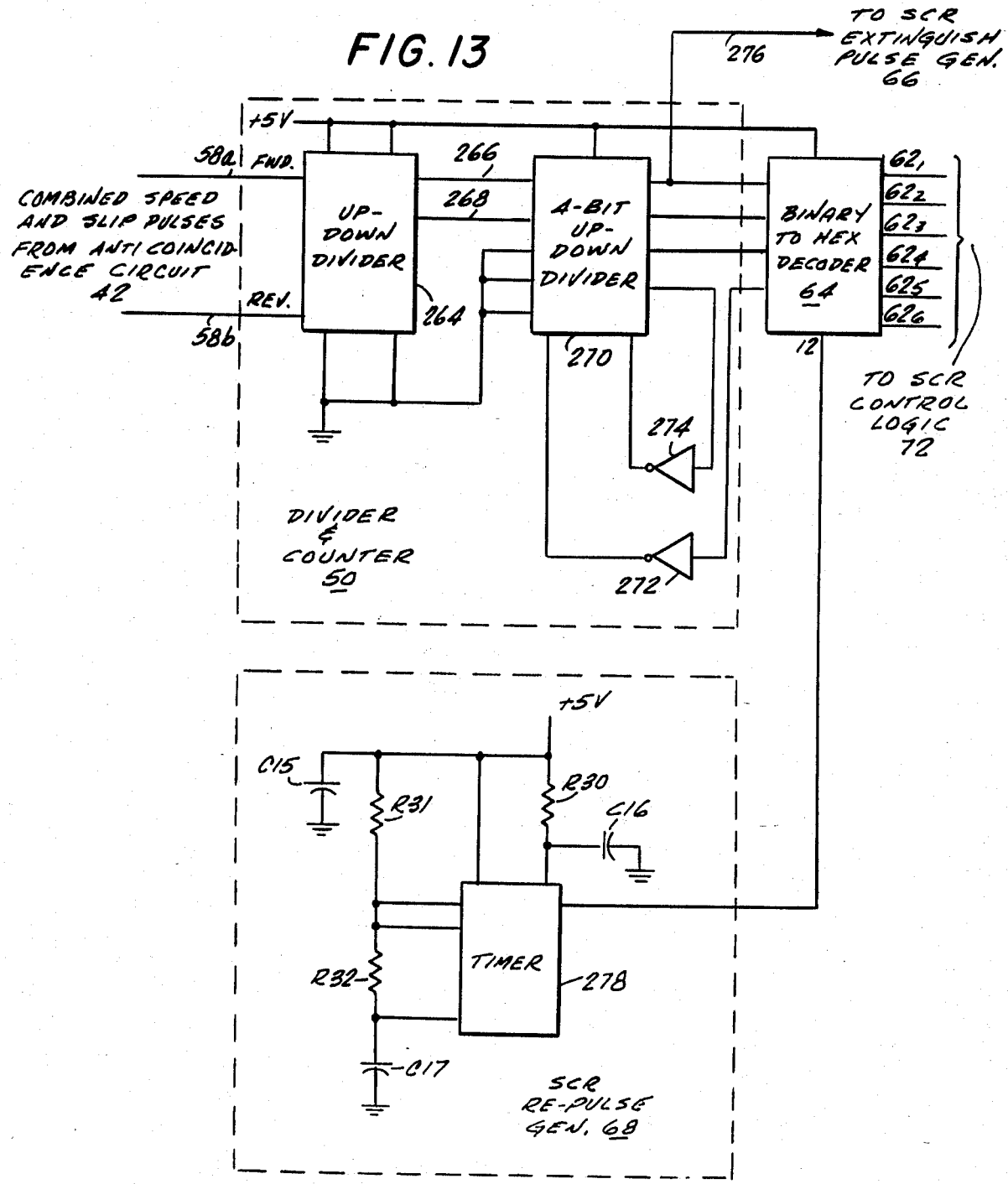

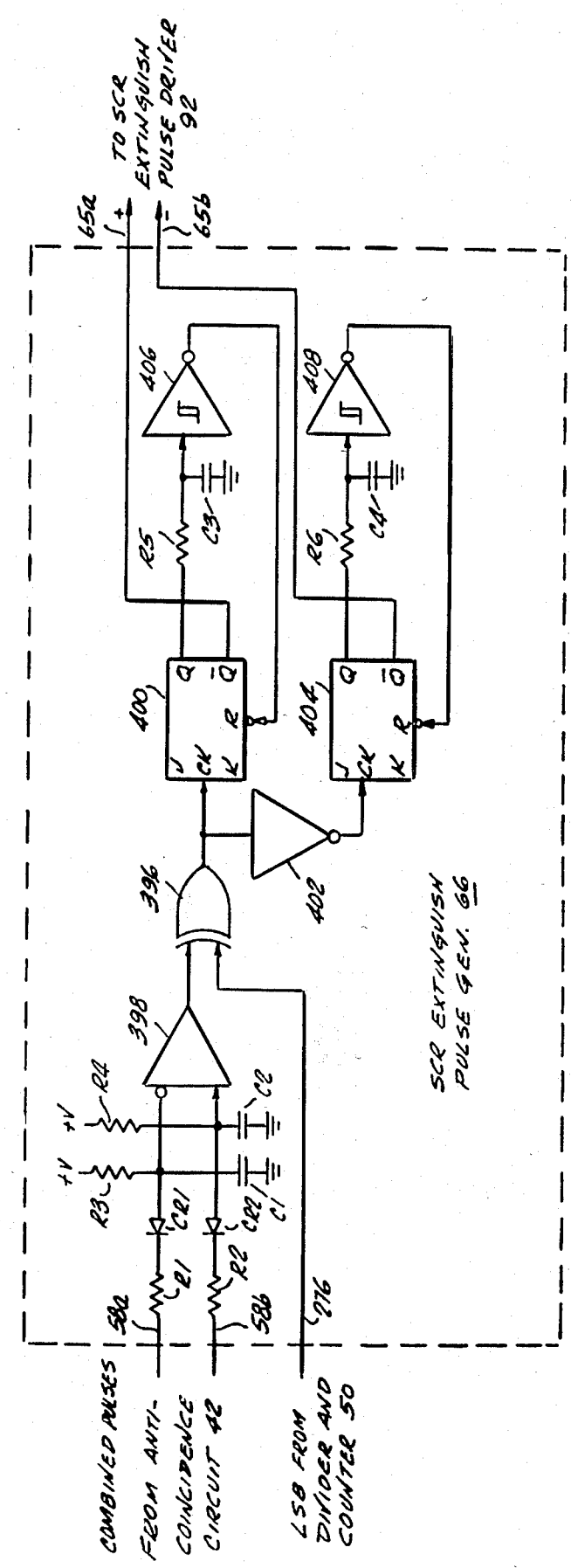

APPARATUS FOR VARIABLE SPEED DRIVE OF AN INDUCTION MOTOR FROM A FIXED FREQUENCY AC SOURCE

This application is a division of application Ser. No. 395,331 filed July 6, 1982.

BACKGROUND OF THE INVENTION

The present invention relates to motor control systems and, more specifically, to motor control systems for variable speed and variable torque induction motor control.

In mobile applications, there is quite frequently the need for variable speed and variable torque motors such as, for example, for winches and hoists. DC motors have been employed in such applications due to the general availability of battery power in mobile vehicles. DC power is less than ideal due to the fact that it is customarily at low voltage, resulting in high copper losses in the supply line as well as the fact that most DC systems generate substantial electrical noise which is undesirable in the presence of sensitive electronic equipment.

In certain applications, and in particular, in airborne applications, high power AC sources of power are generally available at a constant frequency of, for example, 400 Hz. Although it is tempting to consider the use of AC motors in such mobile applications, the ability to achieve variable speed with a constant frequency source has been limited.

In induction motors of the squirrel-cage type, it is possible to control motor speed by varying the voltage of the applied 400 Hz.

As is well known, squirrel-cage induction motors depend on the slip between the rotating magnetic field and the rotating rotor. With a fixed frequency AC source, the only way of varying motor speed is to permit the slip to vary widely. It is also well known that maximum torque, resulting in maximum motor efficiency, occurs at a slip that is a relatively small fraction of the synchronous speed of the motor. As the slip is permitted to increase significantly in order to provide variable motor speed, the motor efficiency becomes poorer and poorer.

OBJECTS AND SUMMARY OF THE INVENTION

Accordingly, it is an object of the present invention to provide a power control system for a variable speed induction motor which overcomes the drawbacks of the prior art.

It is a further object of the invention to provide a power control system for an induction motor wherein the frequency of the AC power fed to the control system remains substantially constant but the speed at which the magnetic flux wave rotates in the motor is variable.

It is a further object of the invention to provide a power control system for a variable speed induction motor in which the motor is driven at a substantially constant value of slip from zero rotor RPM to its maximum speed.

It is a further object of the invention to provide a power control system for an AC motor which gates appropriate positive and negative power phases to pairs of windings of a Y-connected, center open, three phase AC motor in appropriate sequence to produce a rotating magnetic field having an angular velocity equal to the angular velocity of the motor rotor plus or minus a fixed slip frequency.

It is a further object of the invention to provide apparatus for feeding the windings of a three phase motor including an SCR array controlled by gating signals produced in response both to the speed of the motor shaft and a predetermined desired value of slip frequency.

It is a further object of the invention to provide a variable speed induction motor control system containing gated SCR's in which an SCR protect circuit prevents switching from phase to phase of primary power until residual current remaining in previously conducting SCR's is positively extinguished.

According to an aspect of the present invention there is provided a motor control for driving an induction motor of a type having at least first, second and third armature windings from a power source comprising, means for producing a speed signal responsive to a speed of the motor, means for producing a speed command signal representative of a desired speed for the motor, means for producing an error signal responsive to a difference between the speed signal and the speed command signal, means responsive to the error signal for producing a slip signal having a frequency related to a desired value of motor slip, means for combining the speed signal and the slip signal into at least one combined signal, gating means responsive to the combined signal for gating power from the power source to ones of the first, second and third armature windings in a sequence which produces a magnetic field rotating at a frequency equal to the variable speed plus or minus the slip, and power control means responsive to the error signal for controlling an amount of the power fed to the motor whereby motor torque is controlled.

According to a feature of the present invention there is provided a switch for forced commutation of power to an induction motor comprising, a transformer having a magnetically saturable core, first, second and third windings on the core, means for normally maintaining sufficient current on the first winding to keep the core magnetically saturated, a transistor having its base connected to one end of the second winding and its emitter connected to the other end of the second winding, means for passing current in the emitter-collector path of the transistor through the third winding, the means for normally maintaining sufficient current being further effective for momentarily cutting off the current whereby a magnetic field previously maintained by the current collapses and produces a voltage and current spike in the second and third windings, current induced in the second winding being effective to turn on the transistor and cause current to flow in the third winding, the current in the third winding being effective to induce a voltage in the second winding to maintain the transistor in the saturated condition until at least one of impending saturation of the core and increased current in the transistor reduces a gain in the transistor to a value which prevents the second winding from supplying sufficient current to the transistor to maintain it in the saturated condition.

According to further feature of the present invention there is provided a motor control for driving an induction motor of the type having at least first, second and third Y-connected armature windings with ungrounded common from a power source having first, second and third phases comprising an array of silicon-controlled rectifiers, means for sensing a time at which a voltage in one of the first, second and third phases reaches a predetermined maximum, gating means for gating the one phase through the array to a predetermined one of the first, second and third windings at the time, the gating means being further operative at the time for gating the other of the first, second and third phases having a maximum voltage of polarity opposite the predetermined maximum through the array to another predetermined one of the first, second and third windings whereby silicon-controlled rectifiers controlling both positive and negative current flow are simultaneously gated on to provide the current flow through two of the windings in series.

According to a further feature of the present invention there is provided an apparatus for sensing current comprising a magnetically saturable core having at least first and second legs, a first winding on the first leg, a second winding on the second leg, the first and second windings being connected in series and wound opposed to provide balanced equal and opposite outputs, means for driving the first and second legs substantially simultaneously to magnetic saturation, the opposed winding of the first and second legs cancelling output therefrom, means for coupling at least a sample of the current to be sensed to third and fourth windings on the first and second legs, the sample being effective to induce a magnetic flux in the first and second legs, the magnetic flux making the times at which the first and second legs reach magnetic saturation unequal, and the first and second windings being effective, during a time when one of the legs is magnetically saturated and the other is not, to produce an output pulse.

According to a still further feature of the present invention, there is provided an electric brake release control for a brake on an induction motor controlled by a control system, the control system employing speed pulses responsive to motion of the motor and slip pulses defining a desired value of slip of the motor, comprising first means responsive to the slip pulses for releasing the brake when the motor is stationary, second means responsive to the speed pulses for maintaining the brake released as long as the motor is in motion, the second means being effective to prevent the first means from operating once motion has begun whereby brake release is ended and the brake is engaged when the motor stops, and means for permitting the first means to become effective a predetermined period after the brake is engaged.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a drawing identifying the periods during which pulses of power are connected to specific ones of the windings of FIG. 1.

FIG. 6 is a detailed schematic and logic diagram of an up-down discriminator of FIG. 5.

FIG. 12 is a detailed schematic and logic diagram of a three-phase sawtooth generator and a logic diagram of three-phase comparators of FIG. 5.

FIG. 13 is a detailed logic diagram of a divider and counter and a schematic and logic diagram of an SCR repulse generator of FIG. 5.

FIGS. 19A–19C are waveform diagrams to which reference will be made in describing the operation of the SCR extinguish pulse generator of FIG. 5.

FIG. 20 is a detailed logic and schematic diagram of the SCR extinguish pulse generator of FIG. 5.

DETAILED DESCRIPTION OF THE PREFERRED EMBODIMENT

In order to provide a basis for understanding the present invention, the following brief description of a 3-phase induction motor is provided.

Figure 1:
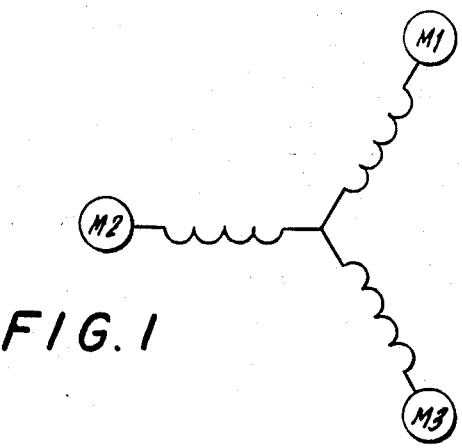
FIG. 1 is a simplified schematic diagram of the windings of an induction motor suitable for use with the present invention.

Referring to FIG. 1, a 3-phase induction motor is provided with three sets of windings M1, M2 and M3 which are fed alternating current from a supply. As is well known, a rotating magnetic field is set up by windings M1, M2 and M3 which rotates at a synchronous speed $n_1$. A squirrel-cage induction motor includes bars of conductive material generally parallel to the axis with ends of the bars shorted together by conductive rings. As the magnetic field rotates past the bars, a current is induced in the bars which interacts with the magnetic field to produce rotation at a forward speed n. The current induced in the rotor depends on the difference between the synchronous speed $n_1$ and the rotor speed n. Such difference is conventionally referred to as the slip frequency of the rotor.

Figure 2:
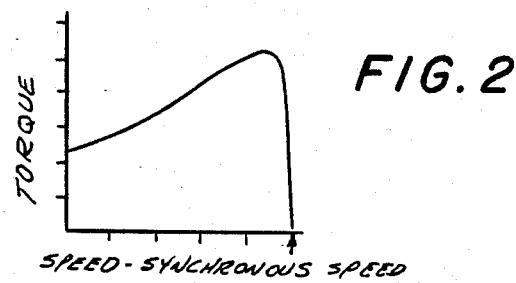
FIG. 2 is a curve relating the torque to the slip in a squirrel-cage motor.

The torque of a typical induction motor is related to the slip. Referring to FIG. 2, there is shown a torque-speed relationship for a conventional induction motor. It will be noted that torque is zero at a rotor speed equal to the synchronous speed of the rotating magnetic field since there is no relative motion between the rotating magnetic field and the rotor to induce a current in the rotor. The torque increases as rotor speed decreases until it reaches a peak and thereafter decreases. In the case of a 60 Hz system, a slip frequency of approximately 6 Hz gives maximum torque.

The applicant has discovered that maximum torque in an induction motor occurs at a substantially fixed slip frequency regardless of the synchronous speed of the magnetic field. That is, if the synchronous speed is variable, maximum torque is achieved, not at a fixed percent of synchronous speed, but at synchronous speed minus a fixed slip value (for a motor) or synchronous speed plus a fixed slip value (for a brake).

In mobile applications, the availability of variable frequency 3-phase power is limited. Thus, DC motors have been conventionally used in such applications as cable hoists in helicopters. DC motors exhibit significant problems in such applications. High power sources at 400 Hz are conventional in aircraft applications. One way of achieving variable motor speed with fixed frequency sources includes limiting the input power to a portion of the waveform of the driving source and thus creating large value of slip. This method is inefficient since relatively high values of magnetizing current are required in the motor without providing corresponding amounts of motor torque.

The present invention employs a cyclo converter to synthesize a driving waveform to a motor which has a frequency substantially different from the AC source of primary power. The primary power source for the synthesized driving waveform can be dc, single-phase or multi-phase. For concreteness of description, a control system employing 3-phase primary power is described. One skilled in the art will recognize the way in which other types of primary power may be similarly controlled to synthesize the driving waveform.

In a 3-phase motor such as illustrated in FIG. 1, synchronous speed of a rotor is achieved at line frequency. That is, for a 400 Hz source, synchronous speed of the magnetic field is 24,000 rpm. Maximum motor speed is limited to a value equal to synchronous speed minus slip. At low motor speeds many cycles of the 400 Hz primary power occur during one revolution of the rotor.

As will be more fully described hereinafter, the present invention employs switching devices such as, for example, silicon-controlled rectifiers (SCR) to simultaneously gate a portion of positive alternations of all three primary power phases to one of windings M1, M2 and M3 and to gate a portion of the negative alternations to a second one of windings M1, M2 and M3.

Referring now to FIG. 3 in conjunction with FIG. 1, a cycle of six periods is defined during which windings M1, M2 and M3 are repetitively pulsed with partial cycles of the 3-phase power. During period one, winding M1 receives positive pulses from phases A, B and C in sequence. At exactly the same times, winding M3 receives negative pulses whereas winding M2 does not receive power. The common connection of windings M1, M2 and M3 (FIG. 1) is left ungrounded. Windings M1 and M3 are placed in series between the positive and negative phases so that current flows through them in series to energize the motor. It will be seen that a plurality of pulses are provided. As the requirement for additional torque occurs, the portion of the cycle of the primary power increases and, similarly, as the torque requirement decreases, the portion of the cycle is reduced. During period two, winding M1 continues to receive positive cycles of power while negative cycles of power are applied to winding M2. This effects a 60° angular rotation of the magnetic field tending to rotate the rotor. Similarly, at the beginning of period three, the positive cycles are shifted to winding M3. This process continues through the end of period six and then begins again. The slower the desired motor rotation, the more cycles of AC power occur in each period. The average power available to the motor is automatically controlled by control of the portion of the cycle gated to the windings as will be more fully described hereinafter.

For convenience of description, FIG. 3 shows a signal as it would appear when fed to a resistive load. When applied to the inductive load of a motor, the waveform is substantially modified depending on the inductance and back EMF of the motor.

Figure 4:
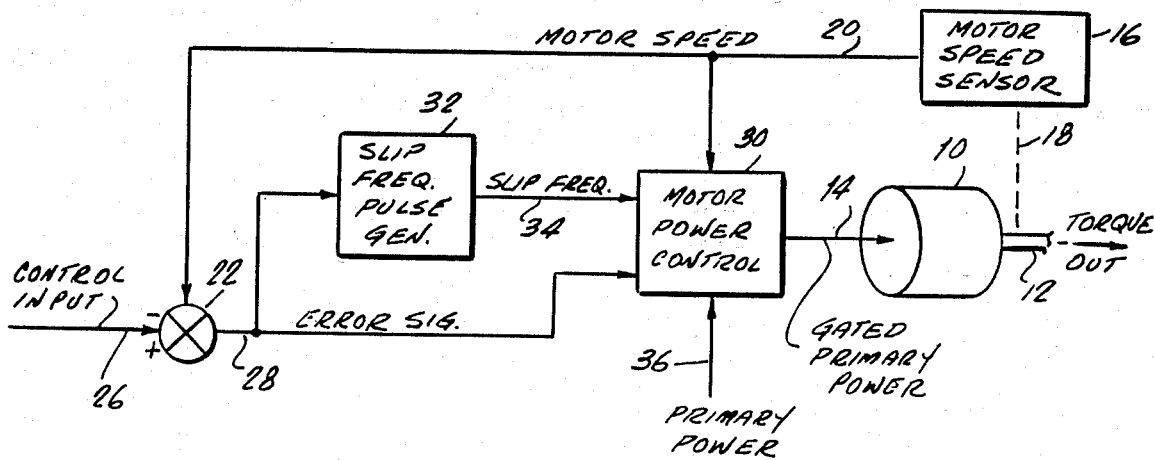
FIG. 4 is a simplified block diagram to provide an initial understanding of the principle of operation of the invention.

Referring to the simplified block diagram in FIG. 4, a motor 10 produces a torque output on a shaft 12 in response to gated primary power fed thereto on a line 14. A motor speed sensor 16 is mechanically coupled to shaft 12 as indicated by a dashed line 18. Motor speed sensor 16 may use any convenient transducer for sensing motor speed such as, for example, magnetic, optical, capacitive, mechanical or any other type of sensing device capable of generating a signal proportional to motor speed. The produced motor speed signal is connected on a line 20 to one input of an adder 22 and a motor power control circuit 30. A control input, which may be manually or automatically generated, is applied on a line 26 to a second input of adder 22. Adder 22 produces an error signal on a line 28 variable in amplitude and sign according to the relationship of its two inputs. The error signal is applied to motor power control 30 and to a slip frequency pulse generator 32.

Slip frequency pulse generator 32 responds to the error signal by producing a zero output frequency when the error signal is zero (indicating exact agreement between the inputs to adder 22) and rapidly rises in the presence of even small positive or negative error signals to a substantially fixed value of slip frequency. In one embodiment, the applicant has discovered that an ultimate slip frequency of about 6 Hz provides most efficient torque development. Motor power control 30 may, however, perform division, multiplication or other type of scaling on the slip frequency generated by slip frequency pulse generator 32 so that the slip frequency on a line 34 is some multiple of the ultimate slip frequency.

Motor power control 30 receives primary power on a line 36 and, in response to the error signal, slip frequency signal and motor speed signal, gates the primary power to the three windings of motor 10 in the sequence of six periods discussed in connection with FIG. 3.

Figure 5:
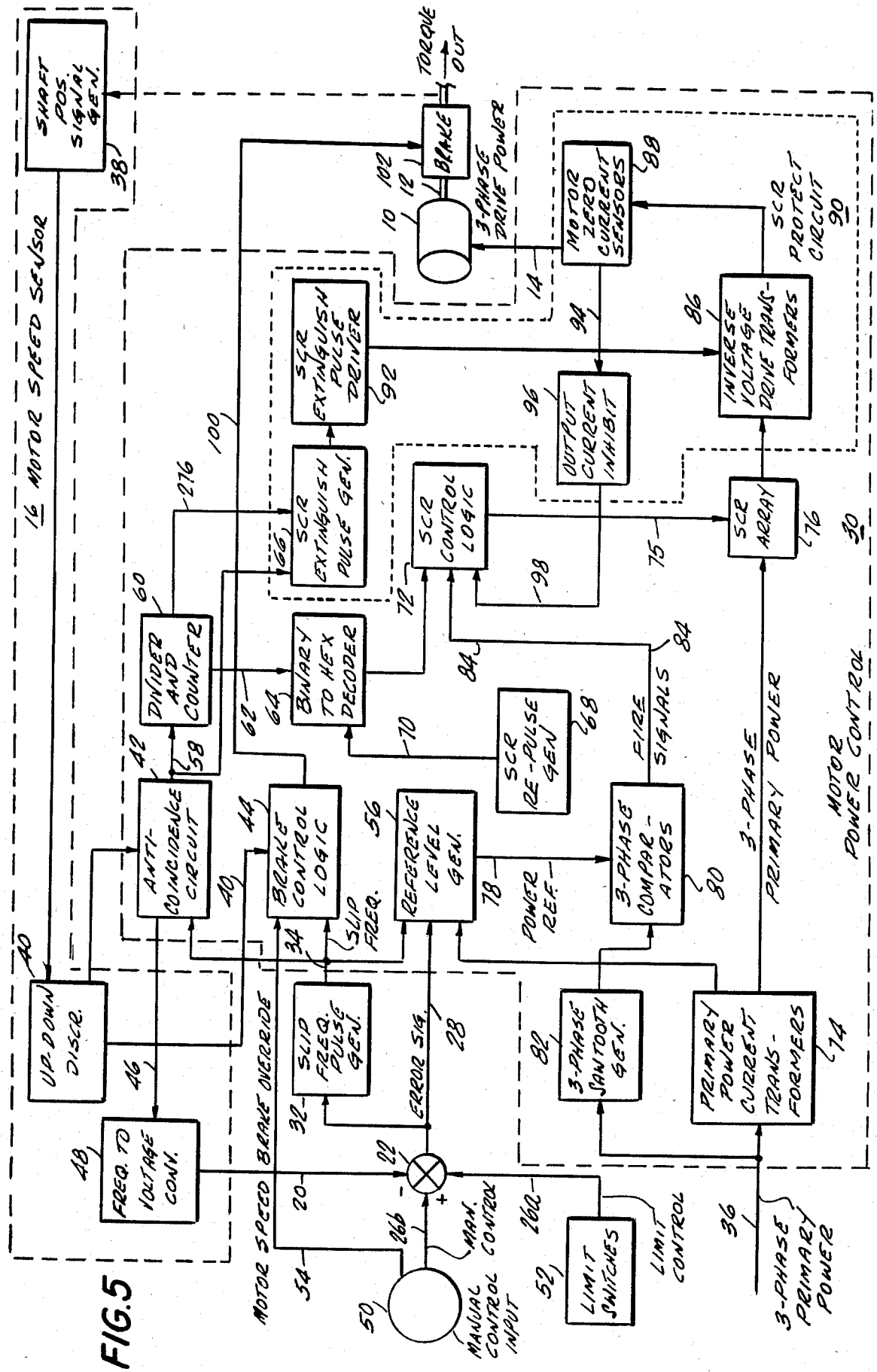
FIG. 5 is a more detailed block diagram to which reference will be made in describing the operation of the system in detail.

In more detail now with reference to FIG. 5, motor speed sensor 16 includes a shaft position signal generator 38 which may be of any type including those previously described. Shaft position signal generator 38 produces first and second separate pulsed or alternating signals displaced 90 degrees in phase from each other. One of these signals is arbitrarily designated a sine signal and the other is designated a cosine signal. Each of the signals produced by shaft position signal generator 38 undergoes a number of alternations per revolution of shaft 12 which is integrally related to the number of poles in motor 10. For the simple motor 10, previously discussed, the sine and cosine outputs of shaft position signal generator 38 includes an integral multiple of six cycles per revolution. For purposes of close speed control, a large number of cycles from shaft position signal generator 38 per revolution of shaft 12 is desirable.

The sine and cosine signals from shaft position signal generator 38 are applied to an up-down discriminator 40. Up-down discriminator 40 senses the direction of motion of shaft 12 and applies sets of pulses on appropriate ones of output lines to an anti-coincidence circuit 42 and to a brake control logic 44. A corresponding set of output pulses are applied on a line 46 to a frequency-to-voltage converter 48. Frequency-to-voltage converter 48 converts the pulse input on line 46 to a corresponding positive or negative motor speed output signal which it applies on line 20 to the minus input of adder 22.

The control input to adder 22 consists of a signal from a manual control input 50 which may be operator controlled and a signal from limit switches 52 to control the speed of motor 10 at appropriate times and to stop it under certain conditions.

A brake override signal is generated in manual control input 50 and is applied on a line 54 to an input of brake control logic 44.

The slip frequency signal from slip frequency pulse generator 32 is applied at three places in motor power control 30 namely anti-coincidence circuit 42, brake control logic 44 and a reference level generator 56. The error signal from adder 22 is also applied to an input of reference level generator 56.

Anti-coincidence circuit 42, receiving the motor speed pulses from up-down discriminator 40 and the slip frequency pulses from slip frequency pulse generator 32, interleaves these two input signals for producing a combined speed and slip signal on a line 58 which is applied to a divider and counter 60. Anti-coincidence circuit 42, to be described more fully hereinafter, contains circuits which avoid the loss of either speed or slip pulses if such pulses should accidentally arrive at the same time. The combined speed and slip pulses may be greater than the input from up-down discriminator 40 when motor 10 is being driven and less than this input when motor 10 is braking.

Divider and counter 60 counts down the combined speed and slip pulses to provide a signal which, after further processing, will control the production of a rotating magnetic field in motor 10 which rotates at a rate equal to motor speed plus or minus the slip frequency. This binary signal is applied on a line 62 to a binary-to-hex decoder 64 and to an SCR extinguish pulse generator 66.

Binary-to-hex decoder 64 produces a set of six output signals on discrete lines which define the periods shown in FIG. 3. An SCR re-pulse generator 68 produces a series of high frequency pulses such as, for example, pulses at 16 KHz which are applied on a line 70 to a gating input of binary-to-hex decoder 64. In this way, the output of binary-to-hex decoder 64 existing at any time is interrupted at a high frequency. This ensures that if an SCR initially fails to respond to a trigger signal, the repeated high frequency triggering thereof will ensure that it is properly triggered with minimum delay.

The six outputs from binary-to-hex decoder 64 are applied to an SCR control logic 72.

Three phase primary power on line 36 is applied through primary power current transformers 74 to an SCR array 76. Primary power current transformers 74 produce signals proportional to the primary current passing therethrough, that is, the three phase current being consumed by motor 10, and applies this signal to reference level generator 56. Reference level generator 56 responds principally to the error signal on line 28 and to the primary current signal from primary power current transformers 74 to produce a current reference signal on a line 78 which is applied to an input of a set of 3-phase comparators 80.

The 3-phase primary power on line 36 is also applied to inputs of a 3-phase sawtooth generator 82 which is, in turn, effective to produce three sets of sawtooth signals accurately phase related to the incoming 3-phase primary power. The three sawtooth signals are applied to inputs of 3-phase comparators 80 and, when each of the sawtooth signals rises to a value which equals the power reference signal, 3-phase comparators 80 produce a fire signal which is applied on a line 84 to an input of SCR control logic 72.

Although reference level generator 56 responds principally to the error signal and the primary power current signal, in cases where the slip frequency does not rise immediately from zero to its fixed value, but instead, can remain at a relatively low level, the slip frequency on line 34 can be applied directly to reference level generator 56 as shown in order to force the current reference signal to respond more rapidly to small values of error signal. As soon as the slip frequency reaches its normal fixed value, this input to reference level generator 56 becomes constant and further changes in the current reference signal depend directly on the error signal and the primary power current.

Under control of the signals from SCR control logic 72, SCR array 76 gates the partial-cycle positive and negative pulses of primary power shown in FIG. 3 to motor 10. These pulses pass through inverse voltage drive transformers 86 and motor zero current sensors 88 of an SCR protect circuit 90.

SCR protect circuit 90 is provided to avoid destructive loss of SCR's from triggering at incorrect times. In particular, since both positive and negative phases are being switched by the SCR array, it is important to ensure that a previously conducting SCR is completely extinguished, that is, carrying zero current, before the next SCR is triggered. Otherwise, it is possible that an SCR remaining conductive while another SCR is triggered on could place a dead short through the SCR across the primary power. This positive extinguishment is guaranteed in two ways. One of the ways includes inverse voltage drive transformers 86 which are two 4-winding transformers through which motor current passes. One of the 4-winding transformers is employed for all positive power cycles and the other is employed for all negative power cycles. Whenever one of the windings in a transformer is energized, it induces a powerful reverse voltage in all three remaining windings of the transformer. This reverse voltage, fed back to SCR array 76 extinguishes all other SCR's that could be feeding the other two phases of power.

In addition to the three windings carrying current from SCR array 76 to motor 10, the fourth winding in each inverse voltage drive transformer is fed a narrow high voltage pulse from an SCR extinguish pulse driver 92 at the instant of changeover from winding to winding. That is, referring momentarily to FIG. 3, a negative extinguish pulse is generated at the transitions from periods one to two, three to four and five to six corresponding to the transfer of negative power pulses between windings M1, M2 and M3. Similarly, positive extinguish pulses are generated at the transitions from periods two to three, four to five and six to one corresponding to the times at which the positive primary power is transferred between windings M1, M2 and M3. When these high amplitude narrow extinguish pulses are fed to the appropriate inverse voltage drive transformer 86, the inverse voltage produced in the 4-winding transformer again tends to positively extinguish any remaining current in the previously conducting SCR array 76.

In addition to employing inverse drive for positively extinguishing the SCR's in SCR array 76, SCR protect circuit 90 also employs motor zero current sensors 88 to produce an inhibit signal on a line 94 as long as motor current is sensed. The inhibit signal is applied to output current inhibit circuit 96 which provides, in turn, an inhibit signal on a line 98 to SCR control logic 72. As long as current to a motor winding in a positive sense is detected by motor zero current sensors 88, SCR control logic 72 is prevented from firing another SCR to produce negative current to the same motor winding. In the same way, if negative current is sensed in a winding, SCR control logic 72 is prevented from firing another SCR to provide positive current to the same winding.

Brake control logic 44 responds to its inputs to provide a signal on a line 100 which is conveniently employed to release a brake 102 under appropriate circumstances. When deenergized, brake 102 locks shaft 12 against rotation. The conditions under which brake 102 is released are discussed hereinafter.

In the detailed circuit descriptions which follow, reference numerals previously employed to identify circuits and connections are used unchanged. However, the nomenclature of individual circuit parts such as, for example, resistors, capacitors, amplifiers, gates, etc., are duplicated in different circuits. That is, when reference is made to resistor R1 in a particular circuit, this identification applies only to circuit under discussion and not to other circuits.

Figure 7F:
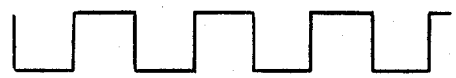
FIGS. 7A–7R illustrate the relationship between the timing of signals in the up-down discriminator of FIG. 6.

Referring now to FIG. 6 and the related waveforms in FIGS. 7A through 7R, the sine input from shaft position signal generator 38 is applied at an input 104 of up-down discriminator 40. Similarly, the cosine signal from shaft position signal generator 38 is applied at input 106. The sine input is squared using amplifiers 108 and 110 and the resulting signal C is applied to an input of an exclusive OR gate 112 and through a 4 microsecond delay consisting of resistor R11 and capacitor C3 to an input of a Schmitt trigger 114. Similarly, the cosine input is squared in amplifiers 116 and 118 with the resulting signal D being applied to the second input of exclusive OR gate 112 and through a 4 micro-second delay consisting of resistor R12 and capacitor C4 to an input of a Schmitt trigger 120. The signal E from exclusive OR gate 112 is applied to an input of an inverter 122 and also directly connected to inputs of NAND gates 124 and 126.

The signal F from Schmitt trigger 114 is applied directly to one input of an exclusive OR gate 128 and through a 2 micro-second delay consisting of resistor R13 and capacitor C5 to an input of exclusive OR gate 128. Since exclusive OR gate 128 provides a positive or high output only when its inputs are different, this condition exists only for the approximately 2 micro-seconds following each change in the input signal F. Thus, every positive and negative transition of signal F produces an output J from exclusive OR gate 128 which lasts for about 2 micro-seconds. It should be noted that due to the preceding delay produced by resistor R11 and capacitor C3, this 2 micro-second signal J from exclusive OR gate 128 does not begin until about 4 micro-seconds after the positive and negative alternations of signal C from amplifier 110. The signal J from exclusive OR gate 128 is applied to inputs of NAND, gates 130 and 126.

In a similar manner the cosine signal is squared, delayed 4 micro-seconds and used to produce delayed 2 micro-second pulses K from an exclusive OR gate 132 which are applied to NAND gates 134 and 124. It should be noted that the signals E and G applied to NAND gates 130, 134, 124 and 126 have not experienced the 4 micro-second delay which was applied in the production of signal J and K from exclusive OR gates 128 and 132. Consequently, signals J and K from exclusive OR gates 128 and 132 occur in the period immediately following the transition of signal E and G from exclusive OR gate 112 and inverter 122 respectively. Thus, the direction of rotation of the motor makes a difference in whether or not signal E or G is high at the time the delayed pulses from exclusive OR gates 128 and 132 arrive. This is shown in FIGS. 7L through 7P in which forward rotation of the motor produces outputs as indicated by the solid pulses in FIGS. 7M and 7P whereas forward rotation of the motor fails to produce signals L and N shown in FIGS. 7L and 7N. Thus, forward rotation of the motor produces the pulses shown in FIG. 7R. Reverse rotation of the motor, on the other hand, produces signals 7L and 7N indicated by dashed pulses shown in 7Q whereas during reverse rotation, signals M and P in FIGS. 7M and 7P are not generated. As a consequence, speed pulses Q are available on output 136 during forward rotation of the motor and speed pulses R are available on output 138 during reverse rotation. The generated speed pulses are applied to anti-coincidence circuit 42.

In addition, signal G from inverter 122 is applied through an output 140 to brake control logic 44.

Figure 8:
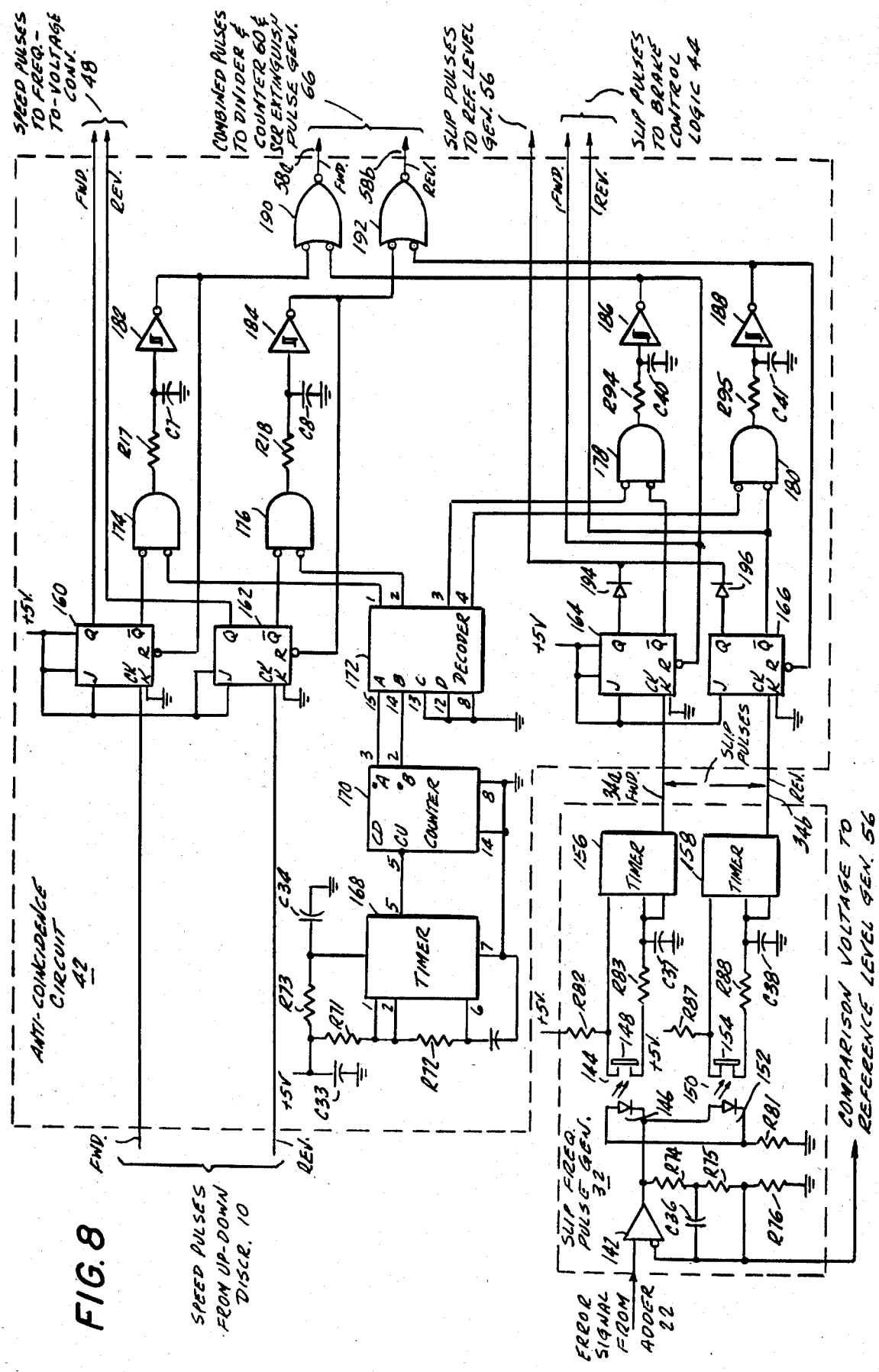
FIG. 8 is a detailed schematic and logic diagram of an anti-coincidence circuit and a slip frequency pulse generator of FIG. 5.

Referring now to FIG. 8, slip frequency pulse generator 32 receives the error signal from adder 22 at one input of an amplifier 142. A feedback aignal is applied from the output of amplifier 142 to its inverting input. This feedback signal is also fed as a comparison voltage to reference level generator 56. The output of amplifier 142 may go both positive and negative in response to the input error signal. A first optical coupler 144 conveniently consists of a light emitting diode 146 capable of controlling a photo-transistor 148 when the output of amplifier 142 is negative. Similarly, an optical coupler 150 includes a light emitting diode 152 capable of controlling a photo-transistor 154 when the output of amplifier 142 is positive. Photo-transistors 148 and 154 comprise frequency-control elements of timers 156 and 158 respectively. In the presence of very small error signals, timers 156 and 158 are energized to produce slip pulses on their respective outputs 34a and 34b which are proportional to the error. At a relatively low threshold value of error, however, timers 156 and 158 are driven to provide a fixed maximum value of slip frequency which may be, for example, related to 6 Hz slip. The relationship is an integral relationship which is later reduced to a one-to-one relationship by divider and counter 60 (FIG. 5). Thus, if the motor is rotating forward, a series of slip pulses is produced on line 34a and line 34b remains inactive. During reverse rotation, the opposite effect is seen.

Timers 156 and 158 may be of any convenient type such as, for example, 555 integrated circuit timers or 556 dual integrated circuit timers.

Anti-coincidence circuit 42 ensures that if a speed pulse and a slip pulse should occur at the same time, neither pulse will be lost but, instead, will be interleaved to be effective in subsequent circuits. This is achieved by storing incoming forward or reverse speed pulses from up-down discriminator 40 in one of flip flops 160 and 162 and similarly storing the slip pulses from slip frequency pulse generator 32 in one of flip flops 164 or 166.

A commutating circuit made up of a timer 168, a 2-bit counter 170 and a decoder 172 sequentially reads out the pulses stored in flip flops 160, 162, 164 and 166. This is accomplished by feeding the inverted outputs Q of these flip flops to inputs of negative AND gates 174, 176, 178 and 180 and feeding the 4 outputs of decoder 172 to the second input of each of these negative AND gates. A delay of about 1 micro-second is applied to the outputs of negative AND gates 174, 176, 178 and 180 by the RC integrating circuits between them and following Schmitt triggers 182, 184, 186 and 188. The outputs of these Schmitt triggers are fed back to the reset input R of their corresponding flip flops 160, 162, 164 and 166 respectively. The same reset pulses from Schmitt triggers 182 and 186 are combined in an OR gate 190 and transmitted to divider and counter 60 as forward combined pulses. Similarly, reverse pulses from Schmitt trigger 184 and 188 are combined in OR gate 192 and transmitted to divider and counter 60.

It should be noted that speed pulses and slip pulses may have the same or opposite sense. That is, if speed is in, for example, a forward direction, the slip pulses may be forward if acceleration is being performed or may be reverse if braking is being performed. Thus, it is possible to have both forward and reverse outputs from OR gates 190 and 192 over the same short period of time.

The first outputs Q of flip flops 160 and 162 remain in the high condition for at least about 1 micro-second due to the delay imposed on the output of negative AND gates 174 and 176 thereby delaying the reset of the flip flops. In addition to this 1 micro-second delay, a slight additional delay is imposed by the time it takes for decoder 172 to provide an output to the specific negative AND gate.

By operating timer 168 at a frequency at least four times the maximum expected frequency of speed pulses, read-out of the stored speed and slip pulses following each speed pulse is completed before the arrival of the next speed pulse. In this way, the speed and slip pulses are interleaved in the output from OR gates 190 and 192.

The direct outputs Q of flip flops 164 and 166 are combined in a diode OR gate consisting of diodes 194 and 196 and are transmitted to reference level generator 56. These pulses are similarly established at a minimum duration of about 1 micro-second by the RC delay on the output of negative AND gates 178 and 180.

Figure 9:
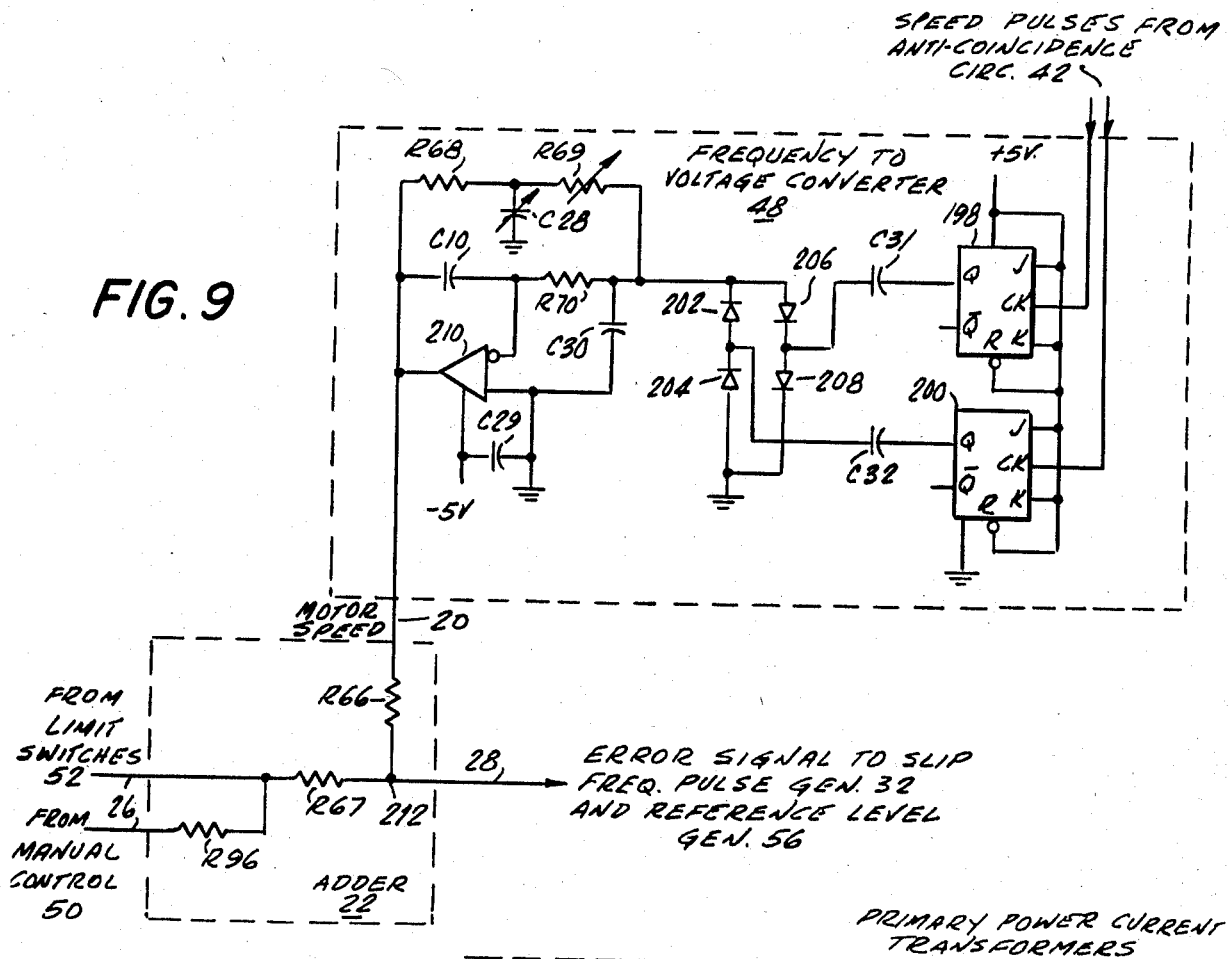
FIG. 9 is a schematic diagram of an adder and a schematic and logic diagram of a frequency-to-voltage converter of FIG. 5.

Referring now to FIG. 9, frequency to voltage converter 48 receives speed pulses from anti-coincidence circuit 42 at clock inputs CK of flip flops 198 and 200. As each speed pulse is received, it triggers or toggles its respective flip flop into its alternate condition. The direct output Q of each flip flop 198, therefore, alternates from positive to negative or vice-versa upon the receipt of each speed pulse.

Forward speed pulses are applied to flip flop 200. The resulting alternations at its direct output Q each couple a fixed charge from capacitor C32 to the junction of a pair of diodes 202 and 204. Diodes 202 and 204 are poled to pass the fixed positive charge coupled thereto by capacitor C32. In a similar fashion, diodes 206 and 208 couple the fixed negative charge derived from reverse speed pulses. Thus, the output of diodes 202, 204, 206 and 208 are positive for forward speed and negative for reverse speed, the pulses have equal charge and their number per unit time is proportional to the speed. The positive or negative charges are integrated in operational amplifier 210 and its related components to produce a smoothly varying positive or negative motor speed voltage having an amplitude proportional to the number of speed pulses fed to it per unit time. Resistors R68 and R69 in the feedback path around operational amplifier 210 control the sensitivity of operational amplifier 210. Capacitor C28 from the junction of resistors R68 and R69 to ground applies a delay in the feedback signal which adjusts the phase of the feedback signal to aid in achieving system stability.

The motor speed voltage is fed on line 20 to a resistor R66 in adder 22. A manual control signal from manual control 50 is applied to a resistor R96 which is effectively in series with a resistor R67 to a junction 212 with resistor R66. A direct line from limit switches 52 is connected to the junction of resistors R96 and R67. This direct connection permits limit switches 52 to overpower or dominate manual control inputs. That is, if the line from limit switches 52 is grounded or held at a fixed level, changes in inputs from manual control 50 have no effect. A voltage developed at junction 212 is the error signal which is transmitted on line 28 to slip frequency pulse generator 32 and reference level generator 56.

Figure 10:
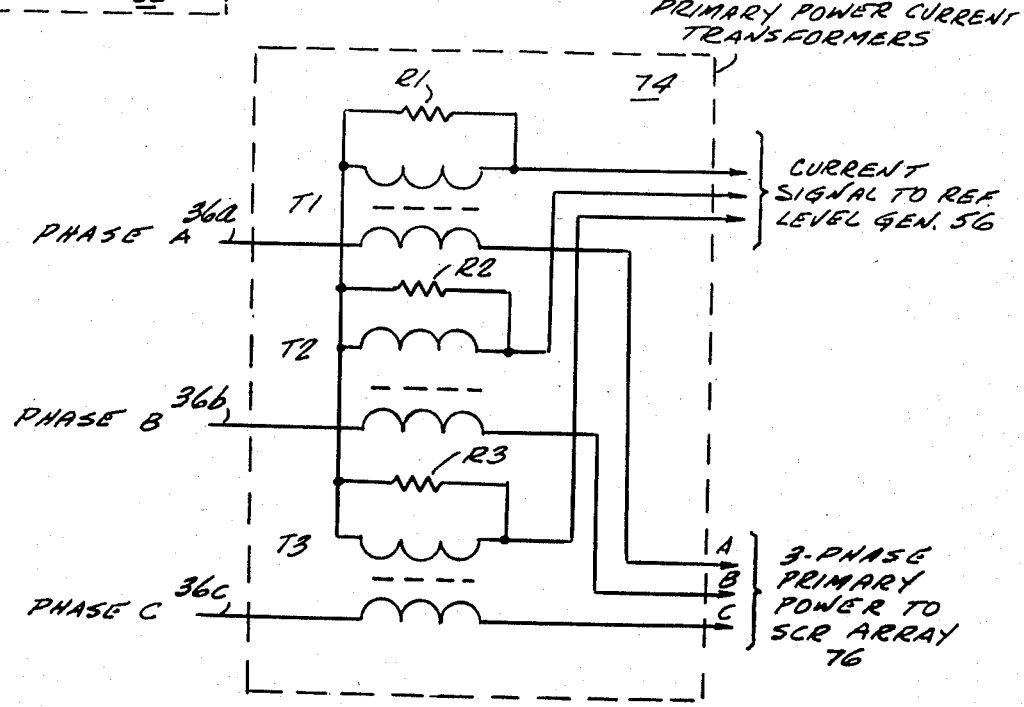
FIG. 10 is a schematic diagram of primary power current transformers of FIG. 5.

Referring now to FIG. 10, primary power current transformers 74 are seen to consist of three current transformers T1, T2 and T3, each having its primary in series with one of the phases A, B and C of the primary power being fed to SCR array 76. One end of the secondaries of each of transformers T1, T2 and T3 are connected together and each is shunted by a resistor R1, R2 and R3. The voltage induced in the three secondaries are transmitted as a current signal to reference level generator 56.

Referring momentarily to FIG. 8, the comparison voltage produced from the error signal by amplifier 142 follows the error signal relatively closely until amplifier 142 limits, and thereafter stays constant.

Figure 11:
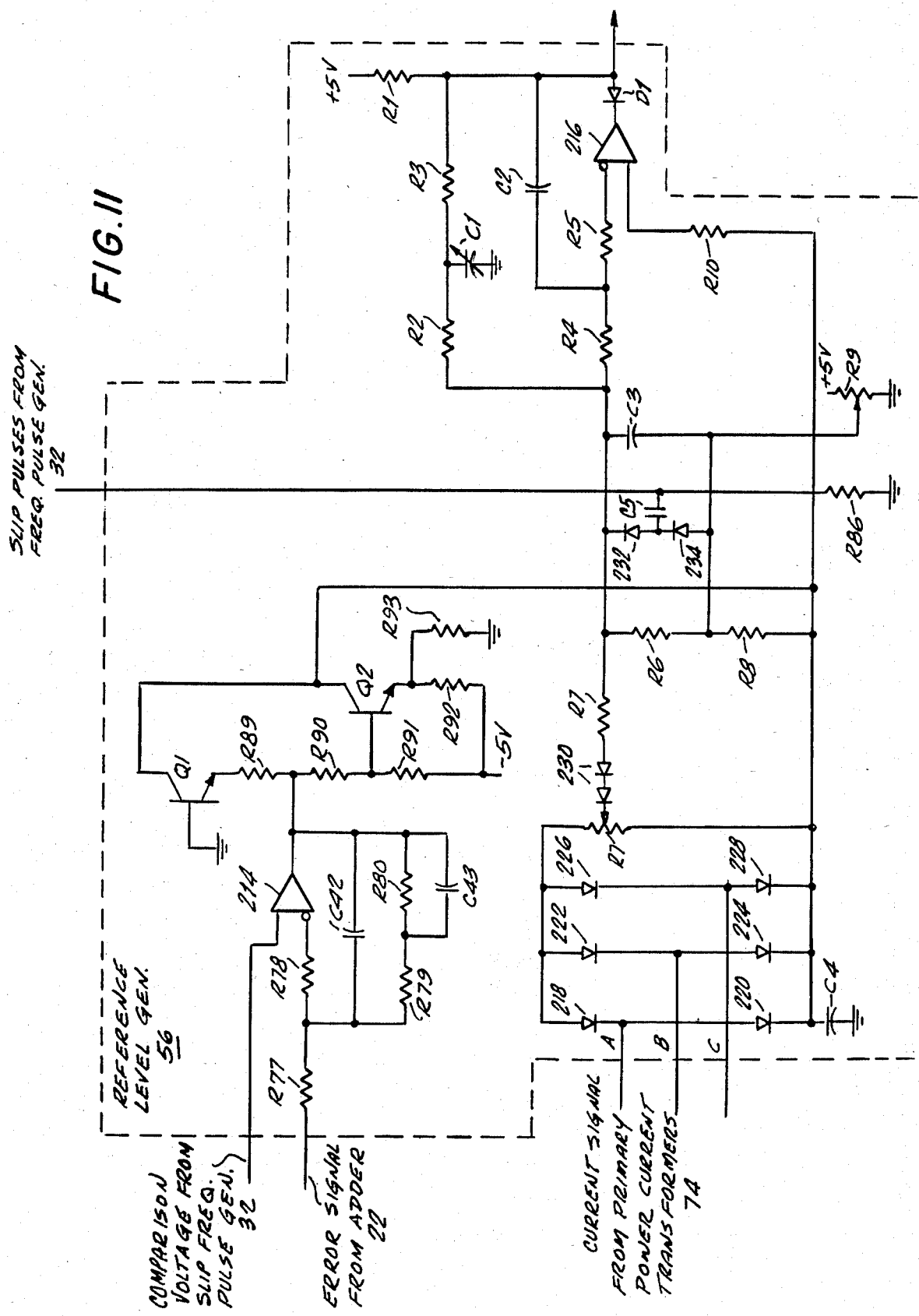
FIG. 11 is a detailed schematic and logic diagram of a reference level generator of FIG. 5.

Referring now to FIG. 11, this just-mentioned signal is applied to the direct input of an operational amplifier 214 in reference level generator 56. In addition, the error signal from adder 22 is applied through resistors R77 and R78 to the inverting input of operational amplifier 214. The feedback elements around operational amplifier 214 severely limit its AC response for stability while still permitting adequate DC gain. Starting from zero error signal, in response to small positive or negative changes in the error signal, the two inputs to operational amplifier 214 change in a generally similar fashion. Under this circumstance, the output of operational amplifier 214 includes just the difference between these two signals and is, therefore, controlled to a relatively small value. However, when amplifier 142 in slip frequency pulse generator 32 (FIG. 8) limits, which occurs at fairly small values of error signal, there is no further change in the direct input to operational amplifier 214. In this circumstance, operational amplifier 214 responds directly to the error signal applied to its inverting input. The output of operational amplifier 214 is amplified and rectified by transistors Q1 and Q2 and is applied through a resistor R10 to the direct input of an operational amplifier 216.

The three-phase current signals from primary power current transformers 74 are applied at the junctions between pairs of diodes 218 and 220, 222 and 224, and 226 and 228. The cathode terminals of diodes 220, 224 and 228 are joined together and to resistor R10 as well as through a capacitor C4 to ground. The anode terminals of diodes 218, 222 and 226 are connected together and to one end of a variable resistor R7. The other end of variable resistor R7 is connected to the junction between the cathode terminals of diodes 220, 224 and 228. A movable contact of variable resistor R7 is connected through one or more diodes 230, resistor R7, resistors R4 and R5 to the inverting input of operational amplifier 216. Resistors R6 and R8 are connected in series from a junction between resistors R7 and R4 to the cathode terminals of diodes 220, 224 and 228. The junction between resistors R6 and R8 receive a variable positive DC voltage selected by variable resistor R9. A capacitor C3 is connected across resistor R6.

The slip pulses from slip frequency generator 32 are coupled through resistor R86 to ground. The junction of capacitor C5 and resistor R86 is connected to the junction between series connected diodes 232 and 234. These diodes are connected in series across resistor R6 and capacitor C3. A fixed positive charge is fed by capacitor C5 during each positive portion of the slip pulses to the junction of resistors R7 and R4 in order to influence operational amplifier 216 at its inverting input. Diodes 218, 220, 222, 224, 226 and 228 apply negative signals to the inverting input of operational amplifier 216 and positive signals to the direct input of operational amplifier 216. Once the motor current increases sufficiently to produce current signals having amplitudes sufficient to overcome diode drops in the circuit and to exceed the signals derived from the error and slip signals, further increase in the reference signal is limited. In case of excessive motor current, the circuit acts rapidly to inhibit such excessive motor current. The feedback elements around operational amplifier 216 shape the response as required for servo stability. The output of operational amplifier 216 is fed to three-phase comparators 80.

In one embodiment of the invention, slip pulses have only a single frequency. That is, as the error signal increases just slightly, the slip frequency goes from zero to its maximum value which may be, for example, about 6 HZ. In the preferred embodiment, however, smoother motor starting is achieved by permitting the slip frequency to vary smoothly from zero over a small increment of error signal. In this case, it is desirable to enhance the reference voltage to the three-phase comparators 80 in response to these relatively low values of slip frequency. This is accomplished by the slip pulses fed through capacitor C5 or to the junction of diodes 232 and 234. In the event that this enhancement from slip frequency pulses is not used, diodes 232 and 234 may be omitted.

Referring now to FIG. 12, phases A, B and C of the three-phase primary power are fed to inputs of respective double Wein bridge filters 235, 238 and 240. It is the function of Wein bridge filters 236, 238 and 240 to sharply attenuate noise and other spurious signals which would otherwise cause false triggering of three-phase comparators 80. A Wein bridge filter has the characteristic that it has relatively low attenuation at a specific frequency but imposes increasing attenuation at frequencies above and below its design point while maintaining excellent phase stability.

The three double Wein bridge filters 236, 238 and 240 are identical therefore only double Wein bridge filter 240 is described in detail.

Phase C of the primary power is applied through a first section 242 and a second section 244 of double Wein bridge filter 240 to the input of a zero crossing trigger 246. First section 242 includes capacitor C1 and resistor R1 in series with the input and a shunt capacitor C2 in parallel with a shunt resistor R2 to ground on the output of the series elements. This combination feeds similar series elements C3 and R3 as well as shunt elements C4 and R4 in second section 244. The power fed to zero crossing trigger 246 and to corresponding zero crossing triggers 248 and 250 for the other phases is substantially smooth with noise and extraneous signals removed from the 400 Hz power.

Zero crossing triggers 246, 248 and 250 feed sawtooth generators consisting of integrating amplifiers 252, 254 and 256 respectively with related timing components.

When phase C, for example, after filtering in double Wein bridge filter 240 crosses zero in the positive-going direction, the output of zero cross trigger 46 suddenly switches from high to low. This signal, fed through variable resistor R15 to the negative input of integrating amplifier 252 begins charging integrating capacitor C10 to thereby generate a positive-going ramp signal which is applied to the negative input of a comparator 258 in three-phase comparators 80. The reference voltage on line 78 from reference level generator 56 is applied to the other input of comparator 258. When the ramp voltage from integrating amplifier 252 exceeds the reference voltage, a C fire signal is applied on a line 84c to SCR control logic 72. The time at which this control signal is generated depends on the amplitude of the reference voltage.

When the filtered signal fed to zero crossing trigger 246 passes through zero in the negative going direction, the output thereof switches to positive or high. Diode CR3 permits the rapid discharge of integrating capacitor C10 to thus essentially instantly reduce the output of integrating amplifier 252 to zero. The overall waveform, therefore, has a sawtooth shape. Variable resistors R13, R14 and R15 are adjusted to adjust the outputs of integrating amplifiers 252, 254 and 256 to track each other.

The remaining comparators 260 and 262 in three-phase comparators 80 operate on phases B and A in the fashion previously described and will not be further detailed.

As previously noted, speed and slip pulses are generated at a multiple of the frequency at which they are used. Referring now to FIG. 13, the combined speed and slip pulses from anti-coincidence circuit 42 are applied to input of an up-down divider 264 which may be, for example, an integrated circuit of the type SN 74193. It will be recalled that speed and slip pulses may be combined on one of lines 58a and 58b or, alternatively, when the speed and acceleration are in opposite directions, they may be applied on opposite ones of lines 58a and 58b. When they are in the same direction, up-down divider counts up or down at the combined rate. When they are in opposite directions, up-down divider 264 counts up or down at a rate equal to the difference between the two inputs. The outputs of up-down divider 264 are applied on two lines 266 and 268 to inputs of a 4-bit up-down counter 270. Three outputs of 4-bit up-down counter 270 are applied to inputs of binary-to-hex decoder 64. The seventh output of binary-to-hex decoder 64 is applied through an inverter 272 to a reset input of 4-bit up-down counter 270. When counting up, this signal fed back from binary-to-hex decoder 64 presets 4-bit up-down counter 270 to zero after every six outputs. An output of 4-bit up-down counter 270 is inverted in an inverter 274 and applied to an input of 4-bit up-down counter 270. When counting down through 0 up/down counter 270 automatically resets itself to the count of 15, i.e. from binary 0000 to 1111. The $2^3$ output of counter 270 goes high and through inverting amplifier 274 resets the output of counter 270 to 5 so that the counter recycles every six input pulses. The counter resides at the count of 15 such a short time that it has no effect on the operation of the system. The least significant bit of 4-bit up-down counter 270 is also applied on line 276 to SCR extinguish pulse generator 66.

The interconnection of 4-bit up-down counter 270 and binary-to-hex decoder 64 with inverters 272 and 274 provides individual gating signals on outputs $62_1$, $62_2$, $62_3$, $62_4$, $62_5$, and $62_6$. In the absence of slip pulses, these output signals define six phase positions of the rotor of motor 10. When the slip pulses are added or subtracted, the phase position defined by these outputs advance at a rate which exceeds or is less than the speed of the rotor. Four-bit up-down counter 270 may be an integrated circuit such as, for example, an SN 74193 and binary-to-hex decoder 64 may be an integrated circuit decoder such as SN 7442.

SCR repulse generator 68 is seen to contain a timer 278 which may be for example, a 555 or 556 integrated circuit timer. With the surrounding discrete components shown, timer 278 produces a square wave signal at a relatively high frequency such as, for example, 16 KHz which is applied to a gating input of binary-to-hex decoder 64. This pulsed input pulses the signal on the one of lines $62_1$ through $62_6$ which is providing an output signal at a very high rate compared to the duration of each of these signals. This pulsed output is employed, as will be described, to repetitively attempt to simultaneously trigger each of the affected SCR's so that if an SCR has failed to become triggered when the control signal is first applied to its gate, repeated pulsing will succeed in triggering it with little time delay. As is well known, of course, when an SCR is triggered, it remains in a conducting condition when the trigger signal is removed. Thus, once the SCR is triggered on, the fact that the control signal to its gate pulses on and off thereafter has no further effect. The six signals on lines $62_1$ through $62_6$ define the six periods shown in FIG. 3.

Figure 14A:
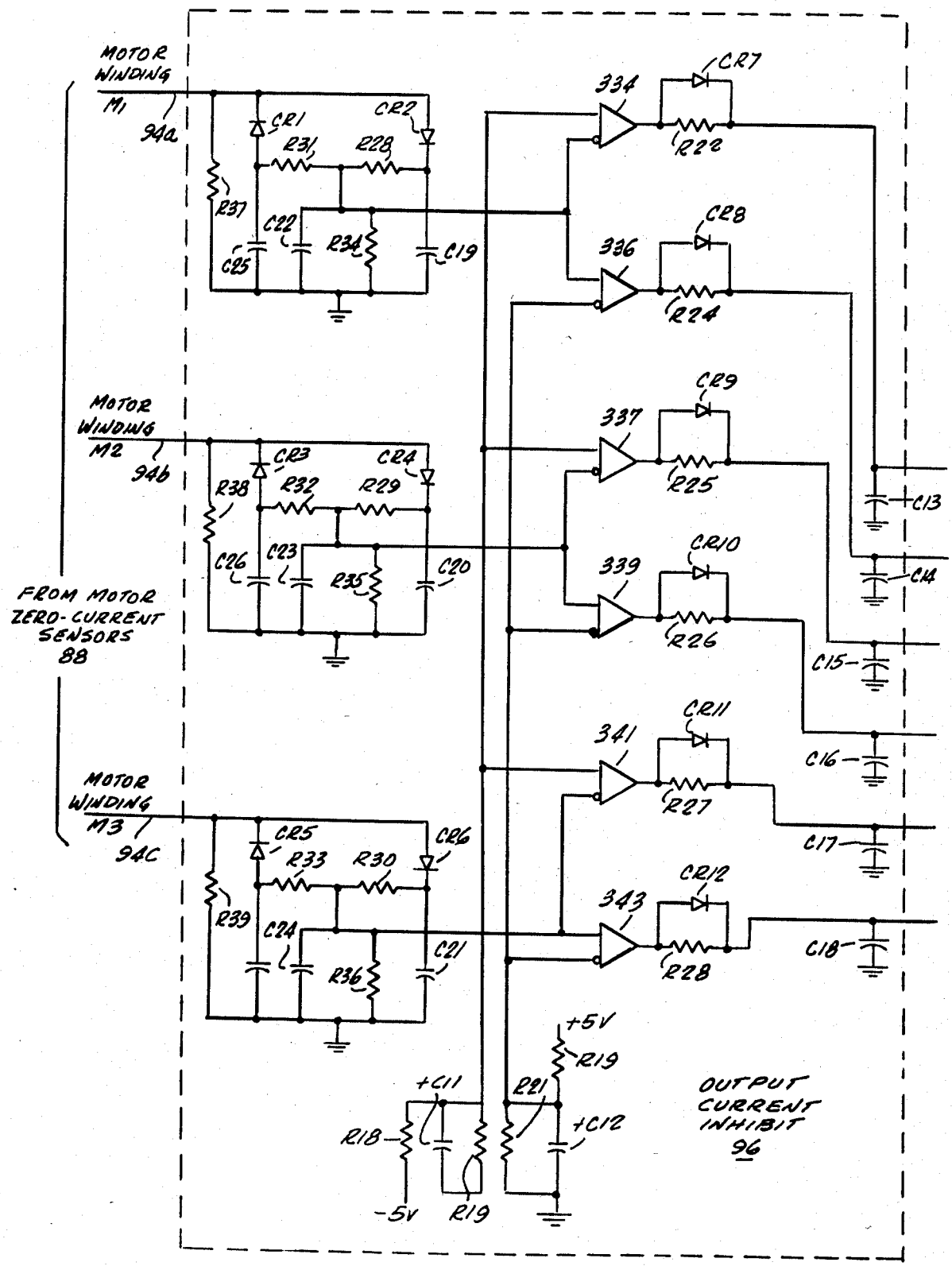
FIG. 14A is a detailed schematic and logic diagram of an output current inhibit of FIG. 5.
Figure 14B:
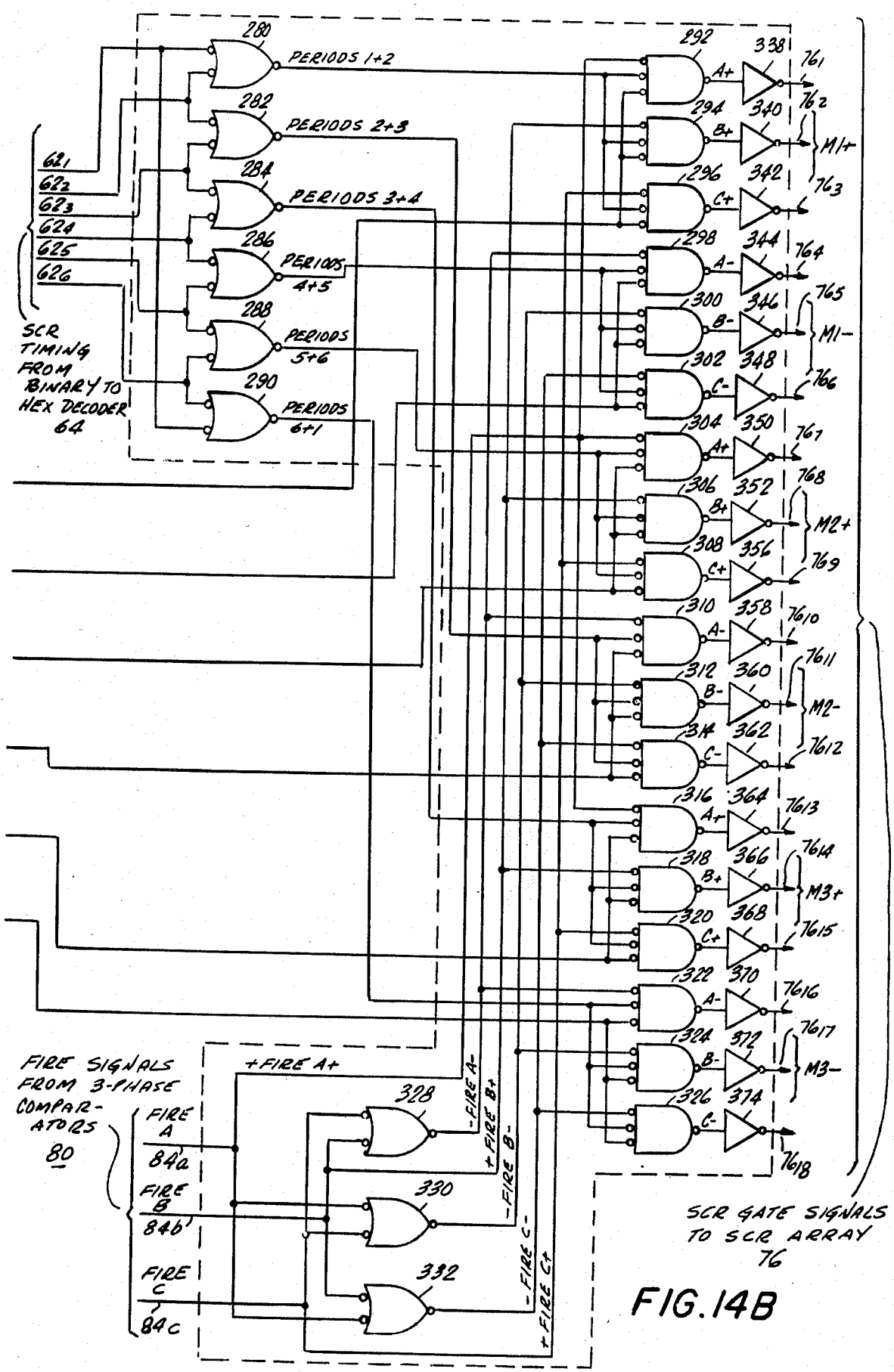
FIG. 14B is a detailed logic diagram of an SCR control logic of FIG. 5.

Referring now to FIG. 14B, the SCR timing signals on lines $62_1$ through $62_6$ are applied to pairs of negative NOR gates 280, 282, 284, 286, 288 and 290. The outputs of the negative NOR gates combine the six periods in the fashion shown adjacent the output lines therefrom to thus define the times during which each of winding M1, M2 and M3 should be energized for positive and negative power. These combined periods are applied to inputs of negative NAND gates 292, 294, 296, 298, 300, 302, 304, 306, 308, 310, 312, 314, 316, 318, 320, 322, 324, and 326.

The fire A, fire B and fire C signals on lines 84a, 84b and 84c respectively are applied direct to inputs of pairs of negative NOR gates 328, 330 and 332. The direct connection defines the firing time for the portions of the positive half cycles of the respective phases, and also simultaneously defines the firing time for the negative portions of both of the other phases. For example, the fire A signal directly enables inputs of negative NAND gates 292, 304, and 316 to control positive cycles of phase A while simultaneously enabling negative cycles of both B and C phases through negative NOR gates 330 and 332. In the same way, the fire B signal directly controls positive cycles of phase B and negative cycles of phases A and C. The fire C signal operates in the same way. By enabling both negative phases with the same signal that enables the positive phase, problems of phase selection are eliminated. Of the two negative phases enabled at any time, only the more negative of the two is effective, the less negative phase automatically remains inhibited at the SCR's, due to the higher reverse potential at the SCR receiving the less negative voltage. Thus, the circuit works equally well for plus or minus phase rotation of the power source.

Output current inhibit 96 receives a high frequency signal from motor zero current sensors 88 on lines 94a, 94b and 94c in response to current in motor windings M1, M2 and M3. As will be more fully described hereinafter, the signals from motor zero current sensors 88 consist of positive spikes when positive motor current is provided and negative spikes when negative motor current exists. These positive or negative spikes on line 94a are detected by diodes CR2 and CR1 respectively and a resulting positive or negative voltage is stored and filtered in the associated RC components. The filtered output is applied to a negative input of a comparator 334 and the positive input of comparator 336. A negative reference voltage is applied to the direct input of comparator 334 and a positive reference voltage is applied to the negative input of comparator 336. When the positive or negative threshold is exceeded at comparator 334 or 336, a positive voltage is transmitted through the appropriate one of diodes CR7 and CR8 to the three negative NAND gates 292, 294, and 296 handling the gating of positive power to winding M1 and to the three negative NAND gates 298, 300 and 302 handling the negative power to winding M1. Thus, when the existence of continued motor current is sensed by motor zero current sensors 88 and transmitted on line 94a, the appropriate ones of negative NAND gates 292 through 302 are inhibited to prevent a direct fire of current from phase-to-phase across the SCR's.

Referring now also to FIG. 3, during period one, negative NAND gates 292, 294 and 296 are enabled by their inputs (provided that negative current is not sensed in winding M1) to provide a gating signal in sequence for positive portions of phases A, B and C to produce the series of positive M1 pulses shown in period one of FIG. 3. At the same time, negative NAND gates 322, 324 and 326 are enabled to provide gating signals for negative portions of the cycles of phases A, B and C. The outputs of negative NAND gates 292 through 326 are inverted in inverters 338 through 374 and transmitted to SCR array 76.

Figure 15:
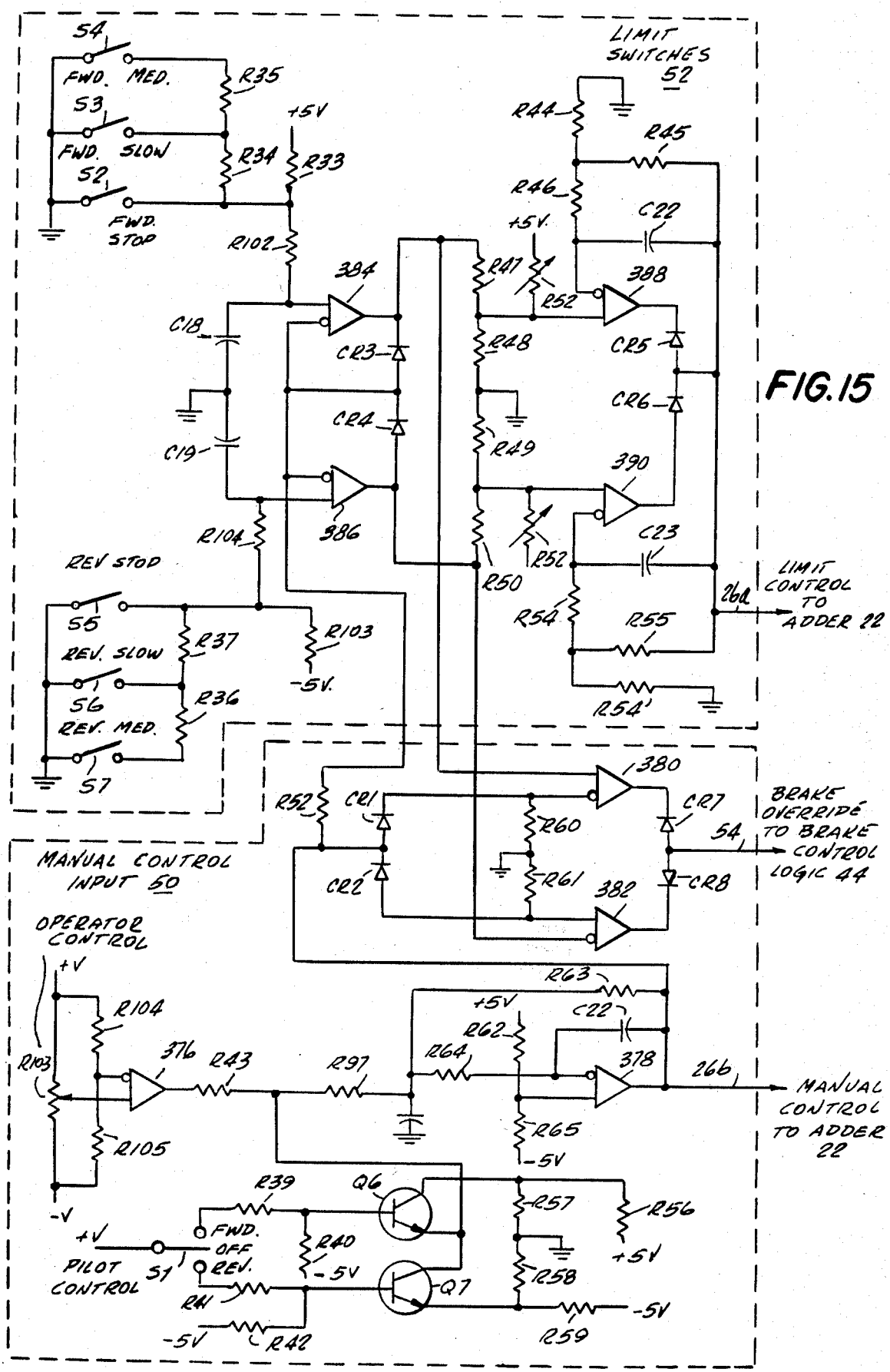
FIG. 15 is a detailed logic and schematic diagram of limit switches and manual control input of FIG. 5.

Referring now to FIG. 15, manual control input 50 includes a variable resistor R103 connected between positive and negative power sources. An operator is able to adjust variable resistor R103 to produce a variable positive or negative voltage which is applied to a direct input for differential amplifier 376. A compensating bridge divider consisting of resistors R104 and R105 feeding the inverting input of differential amplifier 376 compensates for changes in the positive and negative voltages. The output of differential amplifier 376 is applied through series resistors R43, R97 and R64 to an inverting input of an operational amplifier 378. Resistive and capacitive elements in the feedback path from output to inverting input of operational amplifier 378 limit the AC response of operational amplifier 378 to control the jerk applied to the load. Resistors R62 and R65 are connected in series between positive and negative reference voltages respectively and the junction of these two resistors is applied to the direct input of operational amplifier 378. With this connection, the output of operational amplifier on line 26b varies positively and negatively about zero in response to inputs.

A normally open pilot control switch S1 permits selectively driving the motor in either the forward or reverse direction. Switch S1 applies a voltage through appropriate resistors to the base of transistor Q6 or Q7 which is thereupon energized to apply a predetermined positive or negative voltage from the interconnected emitters of transistor Q6 and collector of transistor Q7 to the junction of resistors R43 and R97. The positive or negative applied voltage at this junction forces the output of operational amplifier 378 to a value which provides the predetermined forward or reverse speed.

A circuit including comparators 380 and 382 is employed to override the brake release signal in brake control logic 44 as will be described hereinafter when a limit stop is reached. The manual control signal from the output of operational amplifier 378 is applied through diodes CR1 and CR2 to the inverting and direct inputs respectively of comparators 380 and 382. In addition, this same signal is applied to inverting inputs of limit control amplifiers 384 and 386 in limit switches 52. The direct input of limit control comparator 384 receives a positive voltage through resistors R33 and R102 which may be modified by forward stop limit switch S2, forward slow limit switch S3 and forward medium limit switch S4. Switch S2 grounds the junction of resistors R33 and R102 thus grounding the direct input of limit control comparator 384. Forward slow switch S3 forms a voltage divider with resistor R33 to reduce the voltage applied to the direct input of limit control amplifier 384 to about 1.4 volts. Forward medium switch S4 places resistors R35 and R34 in series to ground with resistor R33 and thereby reduces the voltage applied to the direct input of limit control amplifier 384 to about 4.5 volts. Reverse limit switches S5, S6, and S7 similarly modify the negative voltage fed through resistors R103 and R104 to the direct input of limit control comparator 386.

The cathode terminal of a diode CR3 is connected to the output of limit control comparator 384. The anode terminal of a diode CR4 is connected to the output of limit control comparator 386. The other terminals of diodes CR3 and CR4 are connected together and are fed back to the inverting inputs of limit control comparators 384 and 386. The output of limit control comparator 384 is connected to the direct input of comparator 380. The output of limit control comparator 386 is applied to the inverting input of comparator 382.

A pair of repeater circuits consisting of operational amplifiers 388 and 390 modify the time response of the outputs of limit control amplifiers 384 and 386 so that, as the sequence of limit switch actuations takes place from medium to slow to stop, the control signal applied on line 26a to adder 22 will be relatively smooth and not cause a jerk in the motor response.

In operation, the output of limit control comparator 384 is normally fully positive and the output of limit control comparator 386 is normally fully negative. Changes in the voltage fed to the inverting inputs of limit control comparators 384 and 386 have no influence on them in this condition. Therefore, steady positive and negative voltages are fed therefrom to the indicated inputs of comparators 382 and 380 respectively. Under these conditions, outputs of comparators 380 and 382 remain fully positive regardless of manual control signals from operational amplifier 378. These positive voltages are fed to cathode terminals of diodes CR7 and CR8 whose anode terminals are connected together at line 54. These positive signals back bias diodes CR7 and CR8 thereby permitting brake release signal to be generated by brake control logic 44.

When the motor nears the end of its travel in, for example, the forward direction, forward medium switch S4 is closed. This applies a fixed voltage of about 4.5 volts to the direct input of limit control amplifier 384. As long as the manual control signal fed to the inverting input of limit control amplifier 384 remains below about 4.5 volts, the closure of forward medium limit switch S4 has no effect since the output of limit control amplifier 384 remains fully positive. However, if the manual control signal applied at the inverting input of limit control comparator 384 exceeds the 4.5 volts fed to its direct input, its output attempts to go negative. To overcome this, diode CR3 feeding back this output to the inverting input forces the output to follow its direct input, that is, to remain at about 4.5 volts. This voltage is fed through operational amplifier 388 in the associated repeater circuit to provide direct control of adder 22 regardless of further increase in the manual control signal to adder 22 on line 26b. Thus, the maximum motor speed is limited by the closure of switch S4 but speed commands lower than the value established by switch S4 can be controlled in a normal manner.

In a similar fashion, closure of forward slow switch S3 limits the output fed to adder 22 to a lower value. When forward stop switch S2 is closed at the end of travel of the motor, the resulting ground at the direct input of limit control comparator 384 forces its output to become negative by about one diode drop. This slight negative signal fed to the inverting input of comparator 382 causes the output of comparator 382 to change from positive to negative. This negative signal, fed through diode CR8 on line 54 produces a ground signal which overrides any brake release signal which may exist in brake control logic 44 and thus causes the brake to be applied. At the same time, a zero voltage is applied on line 26a to adder 22 to thereby inhibit any control signal from attempting to drive the motor.

The above condition continues as long as the output signal from operational amplifier 378 remains zero or positive. However, it is desired to permit motion in the opposite direction, namely the reverse direction. When the output of operational amplifier 378 goes negative, this negative voltage is fed through diode CR2 to the direct input of comparator 382. Since this negative voltage is now lower than the only slightly negative voltage fed to the inverting input of this comparator, the output again switches to positive or high and removes the negative signal on line 54 thereby permitting brake control logic 44 to release the brake. At the same time, the negative signal fed to the inverting input of limit control comparator 384 permits the output of limit control comparator 384 to go fully positive and thus remove the limit control signal on line 26a from adder 22. The motor is thereby enabled to operate up to its full controlled speed in the reverse direction until the reverse limit switches are encountered. The operation of the reverse limit switches with limit control amplifier 386 and comparator 380 is identical to that previously described for the generation of a limit control signal on line 26 and a brake override signal on line 54 except that the polarities in the description are reversed. Therefore, the detailed analysis of this operation will not be provided.

Figure 7G:
Figure 7H:
Figure 7J:
Figure 7K:
Figure 16:
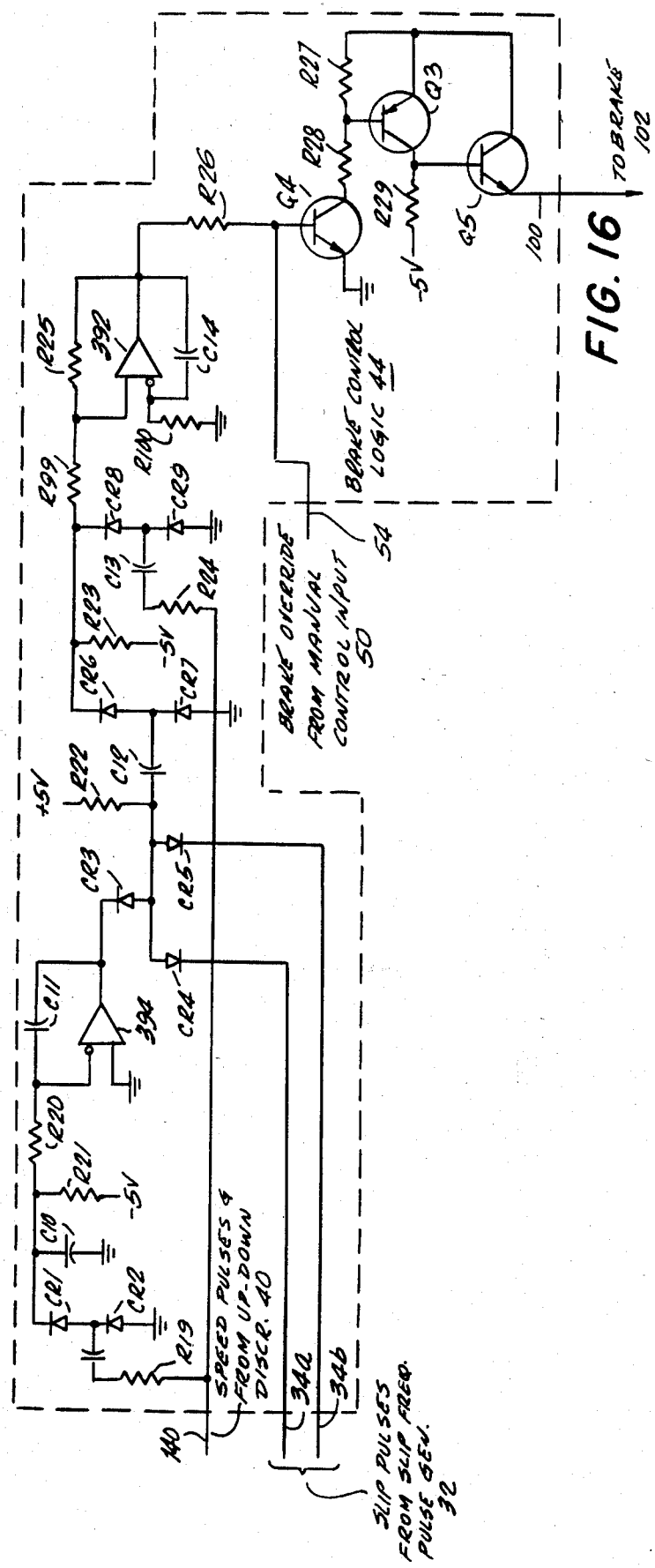
FIG. 16 is a detailed schematic and logic diagram of a brake control logic of FIG. 5.

Referring now to FIG. 16, brake control logic 44 is seen to receive the brake override signal on line 54, slip pulses on lines 34a and 34b and speed pulses G (see FIG. 7G) on line 140. When the motor is stopped with the brake engaged, there are, of course, no speed pulses generated. In order to release the brake for starting the motor, the slip pulses on lines 34a and 34b must be relied on. However, when the motor is running and it is slowed down to a stop, slip pulses are still generated in order to brake or hold the motor against any load. For smooth stopping, it is desirable to permit the brake to be engaged after a period of running when the speed signal goes to zero. In this way, in the stopping sequence, as the motor comes to a halt, the brake is applied and it is thereafter not necessary to hold the load with motor torque and a smooth and secure stop is assured.

In the start-up sequence, slip pulses on line 34a or 34b are applied through cathode terminals of diode CR4 or CR5. The anode terminals of these diodes are normally maintained at a positive voltage fed through resistor R22. The negative going slip pulses are AC coupled through capacitor C12 to the junction of a clamping diode CR7 and a diode CR6. Clamping diode CR7 ensures that the voltage at the junction of CR6 and CR7 varies from ground to a positive value dependent on the signal fed through capacitor C12. The positive AC signal fed through diode CR6 overcomes the negative voltage normally provided through resistor R23 and this positive going signal is fed through a resistor R99 to the direct input of an operational amplifier 392. A large value of capacitance in capacitor C14 slows the AC response of the circuit. The positive output signal from operational amplifier 392, applied through resistor R26 to the base of transistor Q4 produces a signal which, fed through transistor Q3 turns on transistor Q5 to thereby feed a 28-volt brake release signal on line 100 to brake 102.

Once motion has begun and speed pulses are generated, it is desired to accomplish two things, namely to suppress the influence of the slip pulses and to maintain the brake in the released condition in response to the speed pulses alone. The speed pulses, AC coupled through a capacitor C13 produce a positive signal at the cathode terminal of diode CR8 which is fed through resistor R99 to the direct input of operational amplifier 392 to thereby maintain the brake release signal in a manner similar to that previously described.

The speed pulses are also fed through a resistor R19 and AC coupled through a capacitor C9 to the junction of a clamping diode CR2 and the anode terminal of a peak detecting diode CR1. The peak detecting diode CR1 feeds the positive alternations of the incoming signal to a storage capacitor C10, which becomes charged to a positive value. The voltage stored in capacitor C10 is fed through a resistor R20 to the inverting input of an operational amplifier 394. Since the direct input of operational amplifier 394 is grounded the positive voltage derived from the speed pulses therefore drives the output of operational amplifier 394 fully negative and holds it there as long as speed pulses are received. This negative signal holds the junction of the anode terminals of diodes CR3, CR4 and CR5 at a constant negative value and the slip pulses incoming on line 34a or 34b do not produce a change in this signal. Thus, there is no AC component of slip pulses available for AC coupling through capacitor C12 and the slip pulses are thereby suppressed.

When the motor comes to a stop and speed pulses are no longer available, capacitors C10 and C11 tend to maintain the output of operational amplifier 394 in the negative condition for a limited time until the charge stored therein bleeds off. Thus, the slip pulses remain suppressed for this time and, with speed pulses no longer being coupled through capacitor C13 to operational amplifier 392, the output of operational amplifier 392 goes negative and permits transistor Q4 to generate a signal which turns off transistor Q5. This removes the brake release signal on line 100 from brake 102 thus engaging the brake.

When the charge in capacitors C10 and C11 is dissipated, the negative signal at the junction of the anode terminals of diodes CR3, CR4 and CR5 is removed and this point is again raised to a positive voltage so that the slip pulses can again be effective in producing a brake release signal to enable forward or reverse start.

Figure 17:
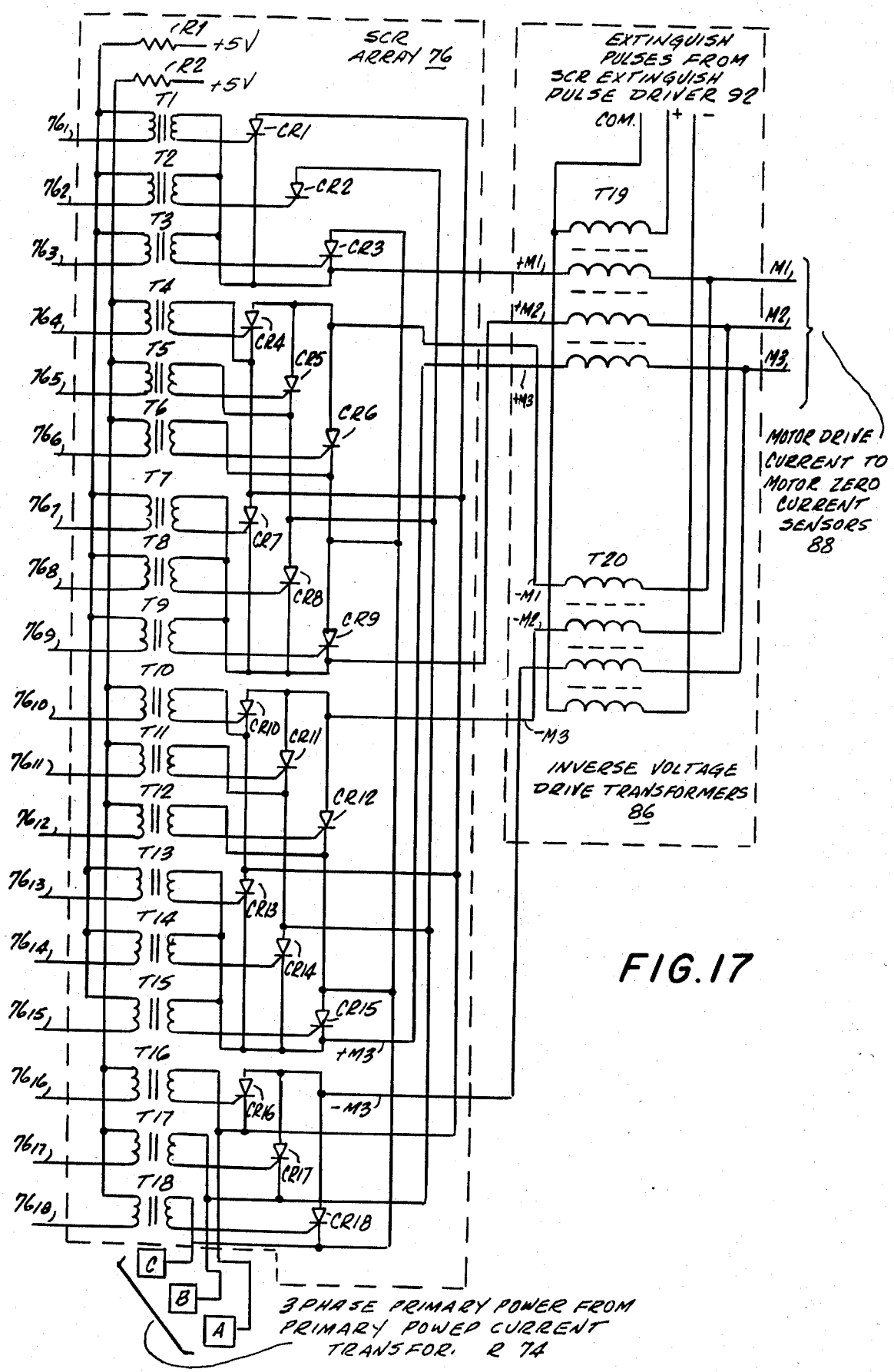
FIG. 17 is a detailed schematic diagram of an SCR array and inverse voltage drive transformers of FIG. 5.

Referring now to FIG. 17, SCR array 76 includes the following SCR's each receiving power from one of the primary power phases A, B, or C at its anode terminal, CR1, CR2, CR3, CR7, CR8, CR9, CR13, CR14, and CR15. The cathode terminals of SCR's CR4, CR5, CR6, CR10, CR11, CR12, CR16, CR17, and CR18 are connected to one of primary power phases A, B, or C. Pulse transformers T1 through T18 each has one terminal of its secondary winding connected to the gate terminal of correspondingly numbered SCR's CR1 through CR18. The other terminal of the secondaries of transformers T1, T2 and T3 are connected together and to the cathode terminals of CR1, CR2 and CR3. The primaries of transformers T1, T2, and T3 have one terminal receiving the SCR gate signals on lines $76_1$, $76_2$ and $76_3$ from SCR control logic 72 and the other terminals thereof connected through a resistor R1 to a +5 volt supply. Since the SCR gating signals on lines $76_1$, $76_2$ and $76_3$ are high frequency pulses at about 16 KHz, transformers T1, T2 and T3 can be very small such as, for example, pulse transformers, to provide a repetitive sharp pulse to the gates of CR1, CR2 and CR3. When the appropriate one of CR1, CR2, and CR3 is successfully gated on, the remaining portion of the positive half cycle of the AC primary power phase applied thereto is connected to the +M1 output line. In a similar fashion, −M1, +M2, −M2, +M3 and −M3 power pulses are produced in the sequence shown in FIG. 3 and are applied to appropriate inputs of inverse voltage drive transformers 86.

Inverse voltage drive transformer T19 includes four windings through three of which the positive power pulses +M1, +M2 and +M3 are connected. Whenever one of the pulses is applied through its winding, a strong opposing pulse is generated in the other three windings of transformer T19. This strong opposing pulse, fed back to the cathode terminals of the other SCR's involved in supplying positive power overcome any remaining current which may be continuing in these SCR's and definitely terminates their conduction. This ensures that only one positive power cycle is being provided at a time. A similar quad winding transformer T20 produces shut-off inverse voltage to all of the other SCR's providing negative power when one of the SCR's is turned on. The fourth winding in inverse voltage drive transformers T19 and T20 receives timed extinguish pulses such as those shown in FIG. 3 coinciding with the transition from period to period. These sharp extinguish pulses provide forced commutation of the rotating magnetic field and give further insurance that previously conducting SCR's are fully extinguished before the next SCR is gated on.

Corresponding positive and negative outputs of inverse voltage drive transformers T19 and T20 are connected together and are transmitted through motor zero current sensors 88 to motor 10.

Figure 18A:
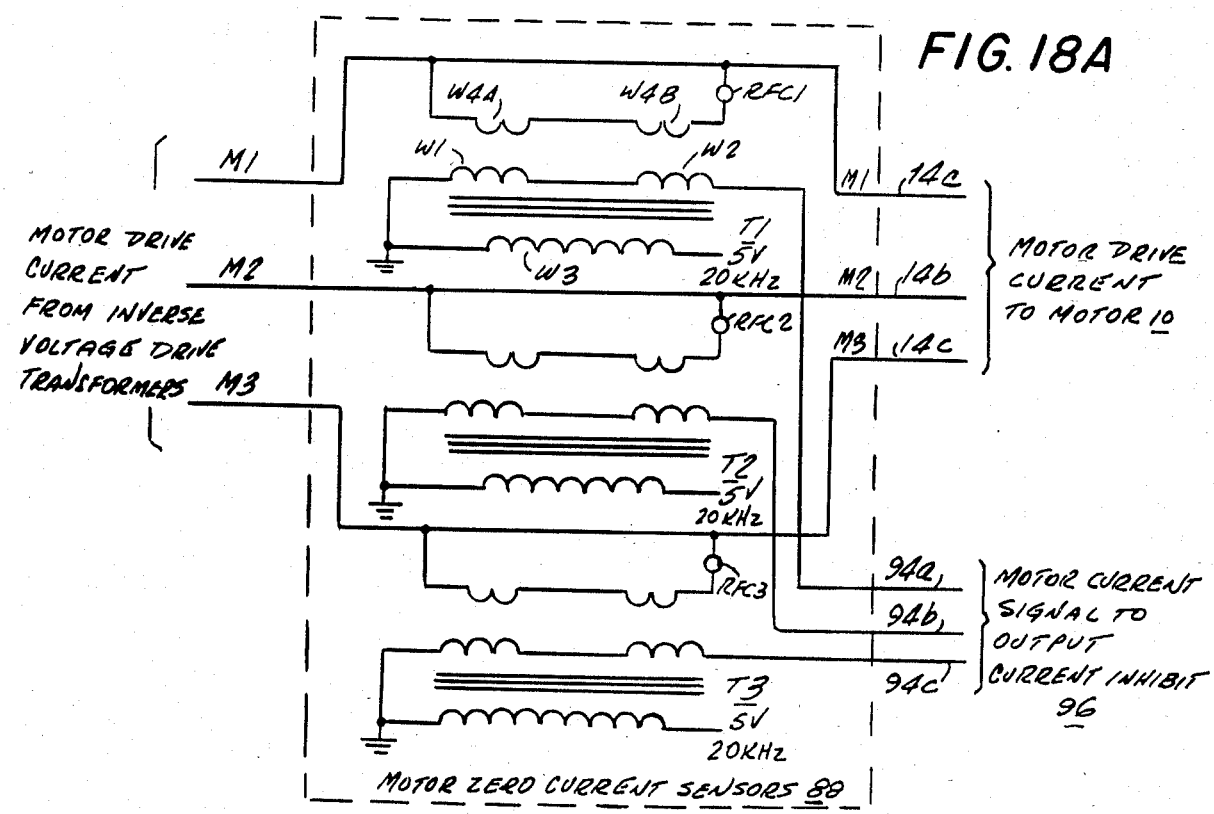
FIG. 18A is a schematic diagram of motor zero current sensors of FIG. 5.

Referring now to FIG. 18A motor zero current sensors 88 contain three sensing transformers T1, T2 and T3. Since all of these transformers are identical, only the operation of transformer T1 which is effective for sensing positive or negative current in winding M1 of the motor is described in detail.

Windings W1 and W2 of transformer T1 are oppositely wound as indicated by the polarity dots. Winding W3 is an excitation winding to which is fed a relatively high frequency signal. In one embodiment, a switching power supply was employed which had a 20 KHz signal available. This was applied to excitation winding W3. A motor current shunt winding W4 is divided into two single turn loops W4A and W4B which are coupled to windings W1 and W2 respectively. An RF choke RFC 1 is provided on shunt winding W4 to prevent shorting of the signal in the single turn loop consisting of shunt winding W4 and the portion of the lead which carries motor current. RFC 1 may be, for example, a ferrite bead or toroid slipped over the lead forming shunt winding W4.

In the absence of motor current to winding M1, winding W3 induces equal and opposite voltages in windings W1 and W2 due to their being oppositely wound. The cores on which these windings are wound are driven alternately to magnetic saturation at the same time in the positive and negative directions. Since these cores are driven completely to saturation on every half cycle of the excitation signal, problems caused by hysteresis from slight residual flux remaining in the cores after the passage of a large current in the windings are eliminated. Although a substantial voltage is induced in windings W2 and W1, since their voltages oppose and are equal in the presence of zero current, and since their cores reach saturation at the same time, the combined output of W2 and W1 is zero. When motor current flows, the magnetic flux created by windings W4a and W4b add to the flux created by one of windings W1 and W2 and subtracts from the magnetic flux created by the other. Therefore, the times at which the cores of windings W2 and W1 reach saturation become slightly unequal. During the period of inequality, a sharp output voltage pulse is produced by W1 and W2. This voltage pulse has a polarity which depends upon the polarity of motor current. Thus, the signal transmitted along line 94a to output current inhibit 96 consists of zero volts when no current flows in motor winding M1 and positive or negative pulses when positive or negative polarities of motor current are provided. This arrangement gives a very sensitive indication of the existence of even very small motor current even after the passage of very large motor current and its detection in this way can be used to inhibit the generation of SCR gate signals until all remaining motor current is terminated.

Motor current is sensed in the same manner for motor windings M2 and M3 and the set of three motor current signals is connected on lines 94a, 94b and 94c to output current inhibit 96 whose operation was previously described.

Figure 18B:
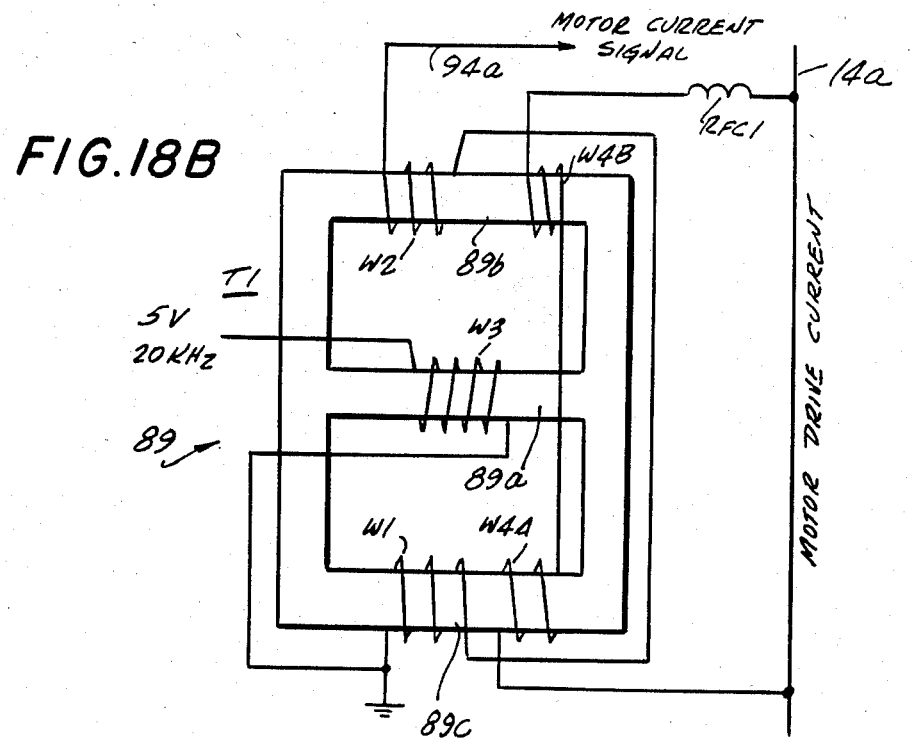
FIG. 18B is a detailed physical representation of a motor zero current sensor transformer of FIG. 18A.

Referring now to FIG. 18B, transformer T1 includes a saturable core shown generally at 89 with a center leg 89a, upon which winding W3 is wound, an outer leg 89b, upon which windings W2 and W4B are wound and an outer leg 89c, upon which windings W1 and W4A are wound. From its central location on center leg 89a, excitation winding W3 drives the magnetic circuits in outer legs 89b and 89c simultaneously to saturation on each half cycle unless current in windings W4A and W4B unbalances the times of saturation.

The preceding describes the ideal case in which windings W1 and W2 as well as the cores on which they are wound are identical. In practice, however, it is very difficult, if not impossible to make these elements precisely identical. If there remains a slight difference between the cores or the windings or both, then legs 89b and 89c do not saturate at precisely the same time. Thus a voltage spike is generated during each positive and negative excursion of the exciting waveform. However, in the absence of motor current, the spikes generated on each half cycle are equal and of opposite polarity to the spikes generated on adjacent half cycles. Thus, when these alternating equal positive and negative spikes are detected and integrated the result is zero. When current flows in windings W4A and W4B, the amplitude of the spikes produced during the positive—or negative—going half cycle of the exciting waveform exceed the spikes produced during the other half cycle and, when detected and integrated, produce a net positive or negative voltage which is then used to prevent firing of the next SCR.

Referring now to FIGS. 19a, 19b and 19c, the waveform in FIG. 19a is the output of divider and counter 60 which is employed to generate SCR extinguish pulses. When the net torque in one direction is forward, considering both speed and slip pulses, the extinguish pulses required by the positive inverse drive transformer T19 in inverse voltage drive transformers 86, should occur coincident with the positive going leading edges of this waveform. This positioning is shown in FIG. 19b. Conversely, when the net torque is in the reverse direction, the positive extinguish pulses are needed coincident with the negative-going edges of the signal in FIG. 19a. This positioning is shown in FIG. 19c. As would be clear from the preceding discussion, opposite positioning is required for extinguish pulses in the negative extinguish pulse transformer T20.

Referring now to FIG. 20, the signal shown in FIG. 19a is connected on line 276 to one input of an exclusive OR gate 396. The forward and reverse combined pulses from anti-coincidence circuit 42 are applied on line 58a and 58b to input resistors R1 and R2 respectively. The combined speed and slip pulses are rectified in diodes CR1 and CR2 and are applied to an inverting and a direct input respectively of a comparator 398. Integrating capacitors C1 and C2 are normally charged to a positive value from a voltage fed through resistors R3 and R4 from the positive voltage supply +V. Diodes CR1 and CR2 are poled to apply a fixed amount of negative charge to their respective integrating capacitors each time a speed or slip pulse is received. Thus, when the combined number of forward pulses per unit time exceeds the combined number of negative pulses per unit time, integrating capacitor C1 is charged to a lower voltage than integrating capacitor C2. Thus, comparator 398 is enabled to produce a high or one input. Conversely, when more reverse than forward pulses are received per unit time, integrating capacitor C2 is charged to a lower value than capacitor C1. In response to this, comparator 398 produces a zero or low output. The output of comparator 398 is applied to the second input of exclusive OR gate 396.

It would be clear to one skilled in the art that exclusive OR gate 396 operates as an inverter for the signal on line 276 when the input from comparator 398 is high and operates as a follower when the input from comparator 398 is low. Thus, the positive-going and negative-going leading edges of the signal on line 276 are duplicated or reversed depending upon the state of signal comparator 398.

The output of exclusive OR gate 396 is applied to the clock input CK of a flip flop 400. The signal is also inverted in an inverter 402 and applied to the clock input CK of a flip flop 404. The inverted or complementary output Q of flip flops 400 and 404 are applied on lines 65a and 65b to SCR extinguish pulse driver 92 for production of the extinguish pulses.

The direct outputs Q of flip flops 400 and 404 are applied through respective RC delays to the inputs of Schmitt triggers 406 and 408 whose outputs are connected back to the reset inputs of their respective flip flops 400 and 404. The RC delays delay the application of the direct outputs Q to the inputs of the Schmitt triggers for approximately 2.2 micro seconds. Thus, reset of flip flops 400 and 404 is delayed for about 2.2 micro seconds. This establishes the width of the pulses on lines 65a and 65b.

Figure 21:
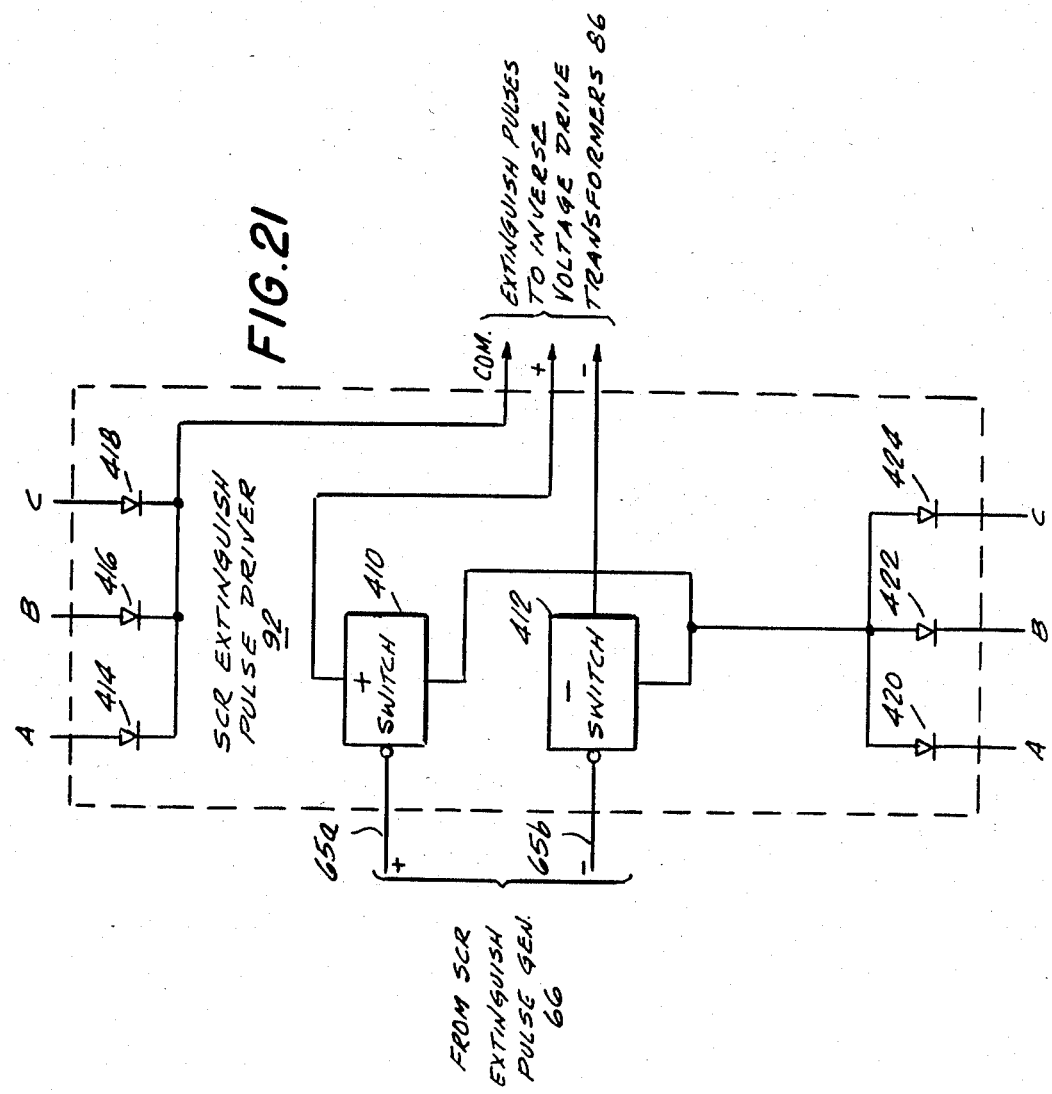
FIG. 21 is a logic diagram of the SCR extinguish pulse driver of FIG. 5.

Referring now to FIG. 21, SCR extinguish pulse driver 92 is seen to contain a plus switch 410 controlled by the plus signal on line 65a and a minus switch 412 controlled by the minus signal on line 65b.

Phases A, B and C are connected to anode terminals of diodes 414, 416 and 418 whose cathode terminals are connected together and are connected to the common point of inverse voltage drive transformers T19 and T20 in unit 86. The other end of the fourth winding in inverse voltage drive transformer T19 (FIG. 17) is connected to switch 410. Similarly, the other end of the fourth winding in transformer T20 is connected to switch 412. Phases A, B and C are connected to the cathode terminals of diodes 420, 422 and 424 whose cathode terminals are connected together and to switches 410 and 412.

When switch 410, for example, is triggered by a pulse on line 65a, it closes to connect the common point of the anode terminals of diodes 420, 422 and 424 through the fourth winding in inverse voltage drive transformer T19 to the common point of the cathode terminals of diodes 414, 416 and 418. When thus connected, the most positive voltage on phases A, B and C at diodes 414, 416 and 418 is connected through inverse voltage drive transformer T19 and switch 410 to the most negative of phases A, B and C at diodes 420, 422 and 424. Switch 410 maintains this connection for an appropriate time to ensure extinguishment of positive current to motor 10.

Similarly, at appropriate times minus switch 412 applies the voltage of the most positive and most negative phases across the fourth winding in inverse drive voltage transformer T20 for an appropriate period.

Switches 410 and 412 may be of any convenient type suitable for withstanding and switching the currents and voltages required for positive extinguishment.

Figure 22:
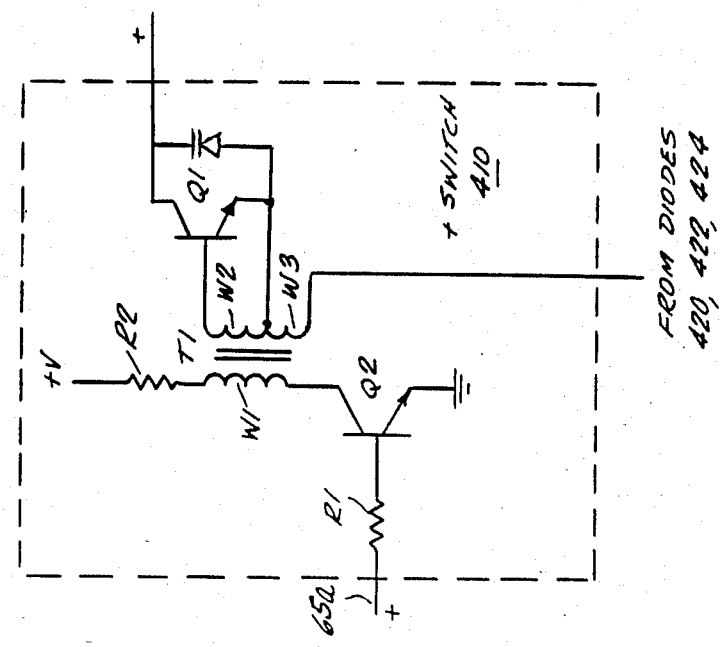
FIG. 22 is a detailed schematic diagram of the switch in FIG. 21.

Switches 410 and 412 may be identical and, in the preferred embodiment, each may be of the type shown in FIG. 22 in which plus switch 410 is illustrated. Transistor Q1 has its collector-emitter path connected in series between the plus output to inverse drive voltage transformer T19 and the anode terminals of diodes 420, 422 and 424. A saturable transformer T1 includes a winding W3 in series from the emitter of transistor Q1 to diodes 420, 422 and 424. The drive pulses on line 65a are applied through a resistor R1 to the base of a transistor Q2. The emitter of transistor Q2 is grounded and its collector is connected through winding W1 of transformer T1 and a resistor R2 to a positive voltage. A winding W2 of transformer T1 is connected between the base and emitter of transistor Q1.

In the quiescent condition, transistor Q2 is maintained in the conducting condition by the signal on line 65a. This draws sufficient current through resistor R2 and winding W1 to maintain the core of transformer T1 in the saturated condition. Since the core of transformer T1 is in the saturated condition, there is no voltage available at winding W2 for turning on transistor Q1. Consequently, transistor Q1 remains in the off condition and there is no current in the path from collector to emitter. When a 2.2 micro second pulse is applied on line 65a to the base of transistor Q2, transistor Q2 is suddenly cut off. The collapse of the field in winding W1 generates a voltage spike in winding W2 which turns transistor Q1 on. With transistor Q1 turned on, current flows therethrough and also through winding W3.

The voltage across a winding of a transformer is proportional to the number of turns and to the rate of change of magnetic flux in the core of the transformer.

The flux is proportional to the magnetizing current in ampere turns. The magnetizing current of a transformer is the difference in ampere turns between the input and output windings and is usually a small percent of the actual winding currents.

If a fixed voltage is applied to the winding of a transformer the core flux will build up at a constant rate causing a back EMF which limits the input current. This situation exists until core saturation is reached whereupon, no more flux increase is possible and no more back EMF is produced. A given transformer can be said to support so many volts per turn per second, i.e. so many micro second volts per turn.

When the relatively small saturating magnetizing current through winding W1 is suddenly turned off, the flux collapse induces a voltage spike in winding W2 which turns on transistor Q1. Since the emitter to base voltage of transistor Q1 clamps at about 0.8 to 1 volt, this clamped voltage across W2 limits the rate of flux reversal in the core and hence controls the length of time that the transformer can support drive to the base of the transistor. During this time, many amperes can flow through windings W3 and W2 so that the small current through winding W1 has negligible effect. After saturation has been reached and the transformer voltages have collapsed, however, the small current through winding W1 is enough to saturate the core and to keep transients from retriggering the circuit. In the preferred embodiment, winding W2 has about 12 turns, winding W3 has about 2 turns and winding W1 has about 24 turns. After interrupting current in winding W1, transistor Q1 is turned on for about 90 to 100 micro seconds. If transistor Q1 suffers a loss of gain due to trying to pass excessive current (i.e. in this case if the gain drops below the turns ratio of 12/2=6), sufficient base current will not be available to maintain transistor Q1 in conduction and the drive will collapse thus terminating the closed condition of the switch prior to full saturation of the core.

As soon as transistor Q1 is turned off, the collapsing magnetic field in windings W1 and W2 drives the core of transformer T1 to saturation in the opposite sense. At this time, the current in W1 passing through transistor Q2 is again effective to maintain the core of transistor T1 in saturation and prevent any possibility of transistor Q1 being again turned on until another trigger pulse is received on line 65a.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although the embodiment shown and described employs a 3-phase motor drive from a 3-phase primary power source, other types of motor and primary power sources are equally within the contemplation of the invention.

I claim:

1. Apparatus for sensing current comprising:
   a magnetically saturable core having a center leg and first and second outer legs;
   a first winding on said first outer leg;
   a second winding on said second outer leg;
   said first and second windings being connected in series and wound opposed to provide balanced equal and opposite outputs;
   an excitation winding on said center leg;
   said excitation winding being effective for driving said first and second outer legs substantially simultaneously to magnetic saturation, the opposed windings of said first and second windings cancelling output therefrom;
   means for coupling at least a sample of said current to be sensed to third and fourth windings on said first and second outer legs, said sample being effective to induce a magnetic flux in said first and second outer legs, said magnetic flux making unequal the times at which said first and second outer legs reach magnetic saturation in response to said excitation winding; and
   said first and second windings being effective, during a time when one of said first and second outer legs is magnetically saturated and the other is not, to produce an output pulse.

2. Apparatus according to claim 1, wherein said first and second windings are wound to produce an output pulse having a first polarity for a first direction of current flow and an opposite polarity for an opposite direction of current flow.

3. Apparatus according to claim 1, wherein said first, second third and fourth windings include means for producing alternating output pulses of equal amplitude and opposite polarity to moments when one of said first and second outer legs is saturated and the other is not saturated when no current is sensed whereby a net zero of said output pulses is produced.

* * * * *